US009408125B2

(12) United States Patent  (10) Patent No.: US 9,408,125 B2
Horn et al.  (45) Date of Patent: Aug. 2, 2016

(54) AGGREGATION OF DATA BEARERS FOR CARRIER AGGREGATION

(71) Applicant: QUALCOMM Incorporated, San Diego, CA (US)

(72) Inventors: Gavin Bernard Horn, La Jolla, CA (US); Jelena Damnjanovic, Del Mar, CA (US); Rajat Prakash, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 135 days.

(21) Appl. No.: 13/934,038

(22) Filed: Jul. 2, 2013

(65) Prior Publication Data
US 2014/0010207 A1 Jan. 9, 2014

Related U.S. Application Data

(60) Provisional application No. 61/668,313, filed on Jul. 5, 2012, provisional application No. 61/811,637, filed on Apr. 12, 2013.

(51) Int. Cl.
*H04W 36/00* (2009.01)
*H04W 36/16* (2009.01)
(Continued)

(52) U.S. Cl.
CPC ............ *H04W 36/165* (2013.01); *H04L 5/001* (2013.01); *H04W 36/28* (2013.01); *H04W 36/22* (2013.01)

(58) Field of Classification Search
CPC ..... H04L 63/30; H04L 63/485; H04W 36/14; H04W 36/22; H04W 36/27; H04W 36/72; H04W 28/02; H04W 28/08; H04W 28/12; H04W 8/24; H04W 48/14; H04W 76/02
USPC ......... 370/252, 310, 331–332, 236, 328–329, 370/338; 455/423, 436, 438, 561
See application file for complete search history.

(56) References Cited

U.S. PATENT DOCUMENTS 8,358,577 B1* 1/2013 Khanka ............... H04L 41/0663
370/221
8,743,696 B2* 6/2014 Chowdhury ............ H04L 45/04
370/237

(Continued)

FOREIGN PATENT DOCUMENTS

CN 103039109 A 4/2013
EP 2293626 A1 3/2011

(Continued)

OTHER PUBLICATIONS

International Search Report and Written Opinion—PCT/US2013/049291—ISA/EPO—Oct. 9, 2013.

(Continued)

*Primary Examiner* — Mohamed Kamara
(74) *Attorney, Agent, or Firm* — Norton Rose Fulbright US LLP

(57) ABSTRACT

Multiple data bearers may be configured for a user equipment (UE) for carrier aggregation and may be split among multiple evolved nodeBs (eNBs). The eNBs may be selected to serve the multiple data bearers for the UE based on various criteria such as channel conditions, loading, and the like. Various eNBs may be selected to serve data bearers for UE on a per data bearer basis, so that a particular eNB may be selected to serve each data bearer of the UE. Each data packet for the UE may then be sent via an appropriate data bearer.

52 Claims, 18 Drawing Sheets

(51) Int. Cl.
*H04W 36/28* (2009.01)
*H04L 5/00* (2006.01)
*H04W 36/22* (2009.01)

(56) References Cited

U.S. PATENT DOCUMENTS

| | | | |
|---|---|---|---|
| 2005/0094588 A1 | 5/2005 | Wentink | |
| 2006/0142021 A1* | 6/2006 | Mueckenheim | H04W 36/22 455/453 |
| 2009/0163218 A1* | 6/2009 | Liu | H04B 7/2606 455/450 |
| 2010/0020767 A1* | 1/2010 | Kumai | H04W 8/087 370/331 |
| 2010/0120459 A1* | 5/2010 | Delaval | H04W 72/1252 455/509 |
| 2010/0172291 A1 | 7/2010 | Kim et al. | |
| 2011/0128862 A1* | 6/2011 | Kallin | H04W 36/22 370/245 |
| 2011/0228676 A1* | 9/2011 | Zhao | H04W 28/08 370/236 |
| 2011/0267948 A1* | 11/2011 | Koc | H04L 5/003 370/235 |
| 2012/0314648 A1 | 12/2012 | Zhang et al. | |
| 2013/0016696 A1 | 1/2013 | Adjakple et al. | |
| 2013/0176988 A1 | 7/2013 | Wang et al. | |
| 2014/0307622 A1 | 10/2014 | Horn et al. | |
| 2015/0109927 A1 | 4/2015 | Ozturk et al. | |

FOREIGN PATENT DOCUMENTS

| | | |
|---|---|---|
| WO | WO-2008076073 | 6/2008 |
| WO | WO-2010078598 A2 | 7/2010 |
| WO | WO-2011100492 A1 | 8/2011 |
| WO | 2012044372 A1 | 4/2012 |
| WO | 2012160977 A1 | 11/2012 |
| WO | WO-2013010005 | 1/2013 |
| WO | WO-2013022751 A1 | 2/2013 |
| WO | 2013040070 A1 | 3/2013 |
| WO | 2013042330 A1 | 3/2013 |
| WO | 2013067464 A1 | 5/2013 |

OTHER PUBLICATIONS

Taleb T., et al., "DNS-Based Solution for Operator Control of Selected IP Traffic Offload", ICC 2011—2011 IEEE International Conference on Communications—June 5-9, 2011—Kyoto, Japan, IEEE, Piscataway, NJ, USA, Jun. 5, 2011, pp. 1-5, XP031908889, DOI: 10.1109/ICC.2011.5963137, ISBN: 978-1-61284-232-5 section D col. 1 p. 2, section A col. 2 p. 2, section A col. 1 page, section V col. 2 p. 4.

Tomici Et J.L., et al., "Multi-RAT traffic offloading solutions for the bandwidth crunch problem", Systems, Applications and Technology Conference (LISAT), 2911 IEEE Long Island, IEEE, May 6, 2011, pp. 1-6, XP031880722, DOI:10.1109/LISAT.2011.5784243, ISBN: 978-1-4244-9878-9, abstract section A col. 2 p. I, section B col. 1 p. 3, section D col. 1 p. 3, section E col. 1 p. 4.

"Views on Rel-12", 3GPP Draft; RWS-120003 Views on Rel-12, 3rd Generation Partnership Project (3GPP), Mobile Competence Centre; 650, Route Des Lucioles; F-06921 Sophia-Antipolis Cedex; France, Jun. 1, 2012, XP050655093.

Shoosfitari A.N., "Optimizing handover performance in LTE rnetworks containing relays", 2011, pp. 1-18.

Taiwan Search Report—TW102124034—TIPO—Mar. 10, 2015.

* cited by examiner

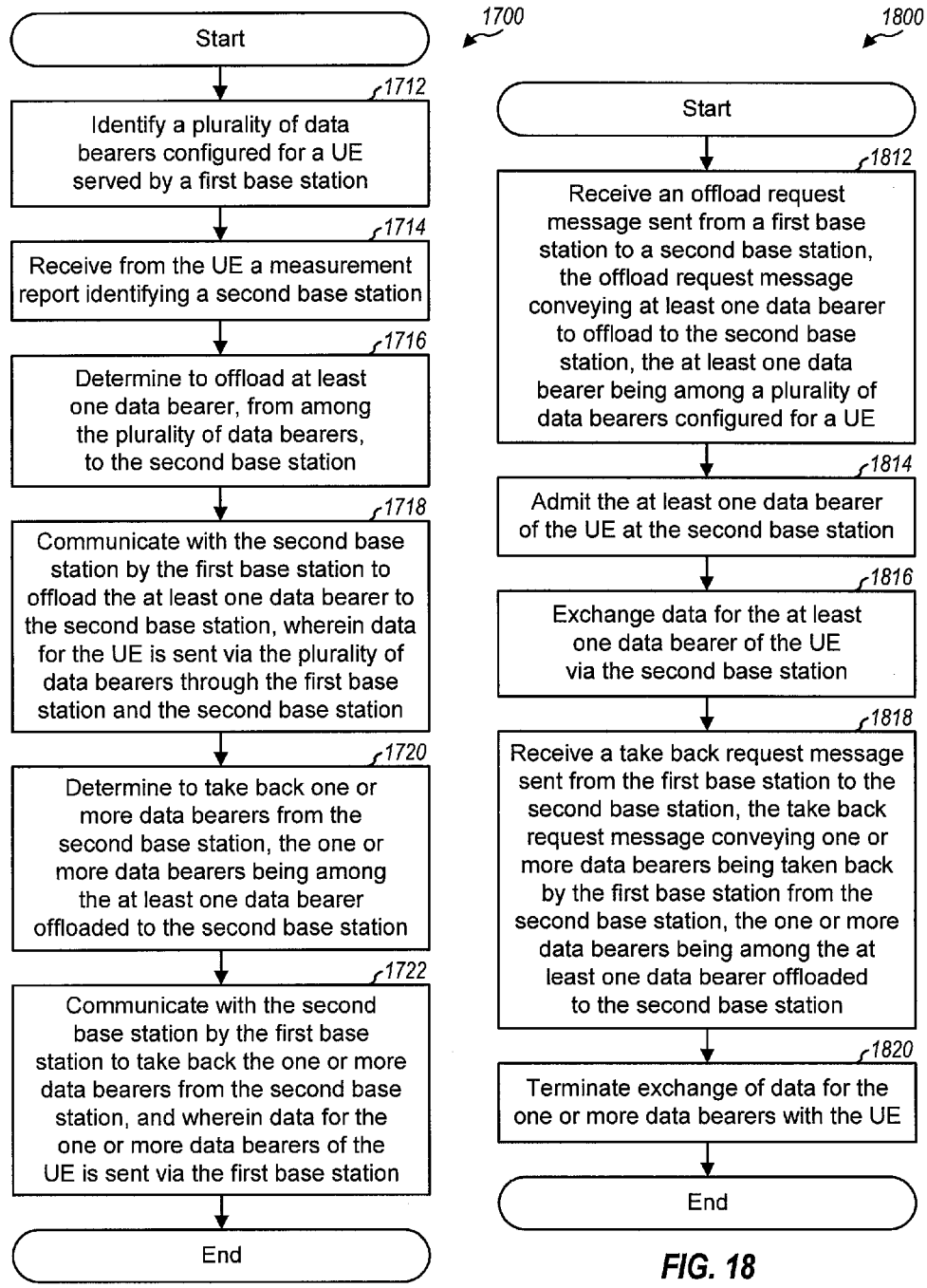

AGGREGATION OF DATA BEARERS FOR CARRIER AGGREGATION

CROSS-REFERENCE TO RELATED APPLICATIONS

This application claims the benefit of U.S. Provisional Patent Application No. 61/668,313, entitled, "AGGREGATION OF DATA BEARERS FOR CARRIER AGGREGATION", filed on Jul. 5, 2012, and U.S. Provisional Patent Application No. 61/811,637, entitled, "PACKET-LEVEL SPLITTING FOR DATA TRANSMISSION VIA MULTIPLE CARRIERS," filed on Apr. 12, 2013, which is expressly incorporated by reference herein in its entirety.

BACKGROUND

I. Field

The present disclosure relates generally to data transmission in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A wireless communication network may support operation on multiple carriers. A carrier may refer to a range of frequencies used for communication and may be associated with certain characteristics. For example, a carrier may be associated with system information describing operation on the carrier. A carrier may also be referred to as a component carrier (CC), a frequency channel, a cell, etc. A base station may transmit data and/or control information on multiple carriers to a UE for carrier aggregation. The UE, may transmit data and/or control information on multiple carriers to the base station.

SUMMARY

In one aspect of the disclosure, a method of wireless communication includes identifying a plurality of data bearers configured for a UE served by a first base station, receiving from the UE a measurement report identifying a second base station, determining to offload at least one data bearer, among the plurality of data bearers, to the second base station, communicating with the second base station by the first base station to offload the at least one data bearer to the second base station, wherein data for the UE is sent via the plurality of data bearers through the first base station and the second base station, and forwarding data for the at least one data bearer from the first base station to the second base station.

In another aspect of the disclosure, a method of wireless communication includes identifying a plurality of data bearers configured for a UE served by a first base station, receiving from the UE a measurement report identifying a second base station, determining to offload at least one data bearer, among the plurality of data bearers, to the second base station, communicating with the second base station by the first base station to offload the at least one data bearer to the second base station, and communicating with a Mobility Management Entity (MME) to convey the at least one data bearer being offloaded to the second base station, wherein data for the UE is sent via the plurality of data bearers through the first base station and the second base station.

In a further aspect of the disclosure, a method of wireless communication includes receiving an offload request message sent from a first base station to a second base station, the offload request message conveying at least one data bearer to offload to the second base station, the at least one data bearer being among a plurality of data bearers configured for a UE, admitting the at least one data bearer of the UE at the second base station, receiving, at the second base station, data for the at least one data bearer from the first base station, and exchanging the data for the at least one data bearer of the UE via the second base station.

In a further aspect of the disclosure, a method of wireless communication includes receiving a first reconfiguration message sent by a first base station to a UE, the first reconfiguration message including first radio resource configuration information for at least one radio access bearer associated with at least one data bearer being offloaded from the first base station to a second base station, accessing the second base station in response to the first reconfiguration message, and exchanging data for the at least one data bearer of the UE via the second base station.

In a further aspect of the disclosure, an apparatus configured for wireless communication includes means for identifying a plurality of data bearers configured for a UE served by a first base station, means for receiving from the UE a measurement report identifying a second base station, means for determining to offload at least one data bearer, among the plurality of data bearers, to the second base station, means for communicating with the second base station by the first base station to offload the at least one data bearer to the second base station, wherein data for the UE is sent via the plurality of data bearers through the first base station and the second base station, and means for forwarding data for the at least one data bearer from the first base station to the second base station.

In a further aspect of the disclosure, an apparatus configured for wireless communication includes means for identifying a plurality of data bearers configured for a UE served by a first base station, means for receiving from the UE a measurement report identifying a second base station, means for determining to offload at least one data bearer, among the plurality of data bearers, to the second base station, means for communicating with the second base station by the first base station to offload the at least one data bearer to the second base station, and means for communicating with a Mobility Management Entity (MME) to convey the at least one data bearer being offloaded to the second base station, wherein data for the UE is sent via the plurality of data bearers through the first base station and the second base station.

In a further aspect of the disclosure, an apparatus configured for wireless communication includes means for receiving an offload request message sent from a first base station to a second base station, the offload request message conveying at least one data bearer to offload to the second base station, the at least one data bearer being among a plurality of data bearers configured for a UE, means for admitting the at least one data bearer of the UE at the second base station, means for receiving, at the second base station, data for the at least one data bearer from the first base station, and means for exchanging the data for the at least one data bearer of the UE via the second base station.

In a further aspect of the disclosure, an apparatus configured for wireless communication includes means for receiving a first reconfiguration message sent by a first base station to a UE, the first reconfiguration message including first radio resource configuration information for at least one radio access bearer associated with at least one data bearer being offloaded from the first base station to a second base station, means for accessing the second base station in response to the first reconfiguration message, and means for exchanging data for the at least one data bearer of the UE via the second base station.

In a further aspect of the disclosure, a computer program product for wireless communications in a wireless network includes a non-transitory computer-readable medium having program code recorded thereon. The program code includes code for causing a computer to identify a plurality of data bearers configured for a UE served by a first base station, code for causing the computer to receive from the UE a measurement report identifying a second base station, code for causing the computer to determine to offload at least one data bearer, among the plurality of data bearers, to the second base station, code for causing the computer to communicate with the second base station by the first base station to offload the at least one data bearer to the second base station, wherein data for the UE is sent via the plurality of data bearers through the first base station and the second base station, and code for causing the computer to forward data for the at least one data bearer from the first base station to the second base station.

In a further aspect of the disclosure, a computer program product for wireless communications in a wireless network includes a non-transitory computer-readable medium having program code recorded thereon. The program code includes for causing a computer to identify a plurality of data bearers configured for a UE served by a first base station, code for causing the computer to receive from the UE a measurement report identifying a second base station, code for causing the computer to determine to offload at least one data bearer, among the plurality of data bearers, to the second base station, code for causing the computer to communicate with the second base station by the first base station to offload the at least one data bearer to the second base station, and code for causing the computer to communicate with a Mobility Management Entity (MME) to convey the at least one data bearer being offloaded to the second base station, wherein data for the UE is sent via the plurality of data bearers through the first base station and the second base station.

In a further aspect of the disclosure, a computer program product for wireless communications in a wireless network includes a non-transitory computer-readable medium having program code recorded thereon. The program code includes code for causing a computer to receive an offload request message sent from a first base station to a second base station, the offload request message conveying at least one data bearer to offload to the second base station, the at least one data bearer being among a plurality of data bearers configured for a UE, code for causing the computer to admit the at least one data bearer of the UE at the second base station, code for causing the computer to receive, at the second base station, data for the at least one data bearer from the first base station, and code for causing the computer to exchange the data for the at least one data bearer of the UE via the second base station.

In a further aspect of the disclosure, a computer program product for wireless communications in a wireless network includes a non-transitory computer-readable medium having program code recorded thereon. The program code includes code for causing a computer to receive a first reconfiguration message sent by a first base station to a UE, the first reconfiguration message including first radio resource configuration information for at least one radio access bearer associated with at least one data bearer being offloaded from the first base station to a second base station, code for causing the computer to access the second base station in response to the first reconfiguration message, and code for causing the computer to exchange data for the at least one data bearer of the UE via the second base station.

In a further aspect of the disclosure, an apparatus configured for wireless communication includes at least one processor and a memory coupled to the processor. The processor is configured to identify a plurality of data bearers configured for a UE served by a first base station, to receive from the UE a measurement report identifying a second base station, to determine to offload at least one data bearer, among the plurality of data bearers, to the second base station, to communicate with the second base station by the first base station to offload the at least one data bearer to the second base station, wherein data for the UE is sent via the plurality of data bearers through the first base station and the second base station, and to forward data for the at least one data bearer from the first base station to the second base station.

In a further aspect of the disclosure, an apparatus configured for wireless communication includes at least one processor and a memory coupled to the processor. The processor is configured to identify a plurality of data bearers configured for a UE served by a first base station, to receive from the UE a measurement report identifying a second base station, to determine to offload at least one data bearer, among the plurality of data bearers, to the second base station, to communicate with the second base station by the first base station to offload the at least one data bearer to the second base station, and to communicate with a Mobility Management Entity (MME) to convey the at least one data bearer being offloaded to the second base station, wherein data for the UE is sent via the plurality of data bearers through the first base station and the second base station.

In a further aspect of the disclosure, an apparatus configured for wireless communication includes at least one processor and a memory coupled to the processor. The processor is configured to receive an offload request message sent from a first base station to a second base station, the offload request message conveying at least one data bearer to offload to the second base station, the at least one data bearer being among a plurality of data bearers configured for a UE, to admit the at least one data bearer of the UE at the second base station, to receive, at the second base station, data for the at least one data bearer from the first base station, and to exchange the data for the at least one data bearer of the UE via the second base station.

In a further aspect of the disclosure, an apparatus configured for wireless communication includes at least one processor and a memory coupled to the processor. The processor is configured to receive a first reconfiguration message sent by a first base station to a UE, the first reconfiguration message including first radio resource configuration information for at least one radio access bearer associated with at least one data bearer being offloaded from the first base station to a second base station, to access the second base station in response to the first reconfiguration message, and to exchange data for the at least one data bearer of the UE via the second base station.

BRIEF DESCRIPTION OF THE DRAWINGS

FIGS. 17-19 are functional block diagrams illustrating example blocks executed to implement aspects of the present disclosure.

DETAILED DESCRIPTION

Techniques for supporting communication via multiple carriers for carrier aggregation in a wireless communication network are disclosed herein. These techniques may be used for various wireless communication networks such as CDMA, TDMA, FDMA, OFDMA, SC-FDMA and other wireless networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 includes IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi and Wi-Fi Direct), IEEE 802.16 (WiMAX), IEEE 802.20, Flash-OFDM®, etc. UTRA, E-UTRA, and GSM are part of Universal Mobile Telecommunication System (UMTS). 3GPP Long Term Evolution (LTE) and LTE-Advanced (LTE-A), in both frequency division duplexing (FDD) and time division duplexing (TDD), are recent releases of UMTS that use E-UTRA, which employs OFDMA on the downlink and SC-FDMA on the uplink. UTRA, E-UTRA, GSM, UMTS, LTE and LTE-A are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
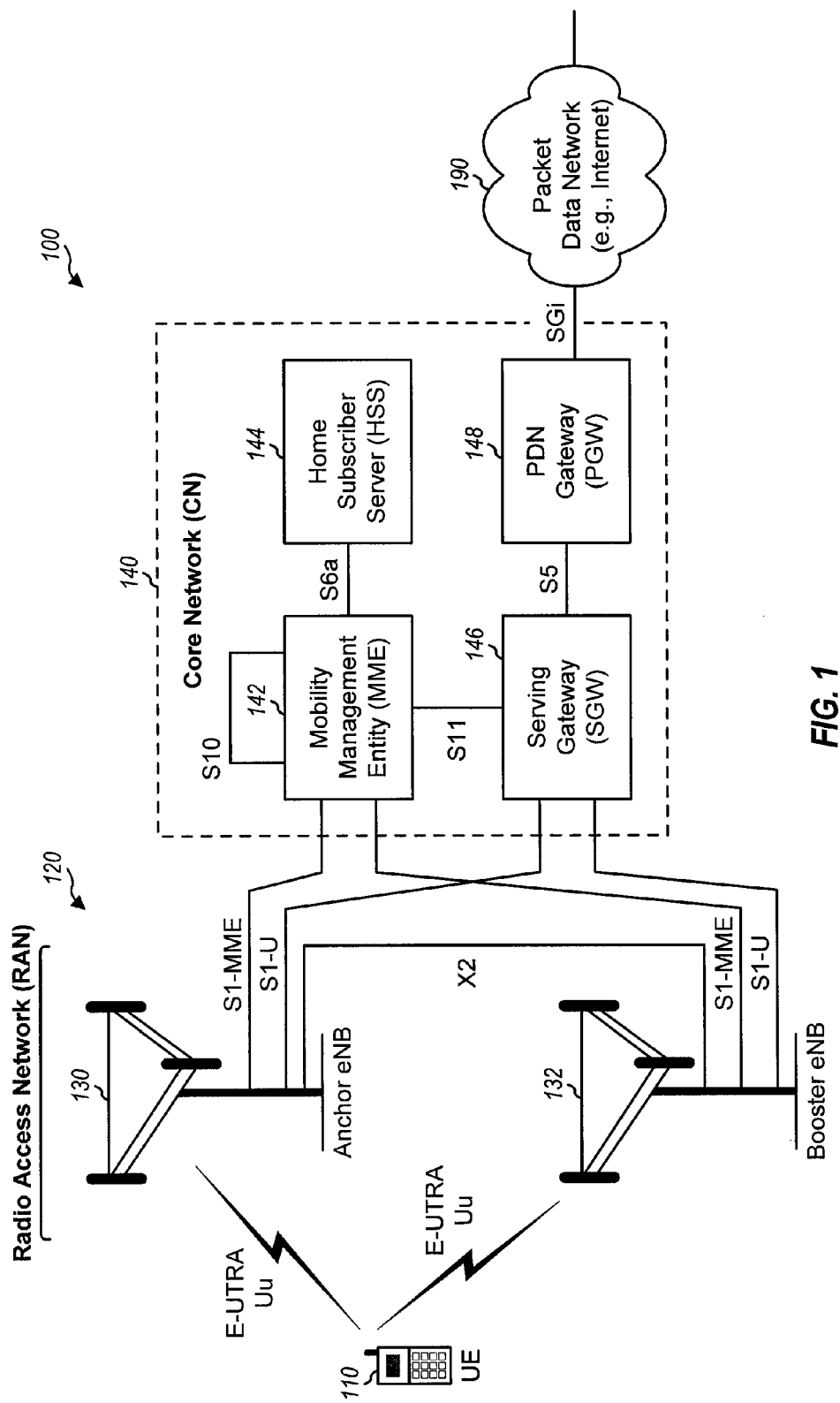
FIG. 1 is a block diagram illustrating a wireless communication network, which may be an LTE network or some other wireless network.

FIG. 1 shows a wireless communication network 100, which may be an LTE network or some other wireless network. Wireless network 100 may include a radio access network (RAN) 120 that supports radio communication and a core network (CN) 140 that supports data communication and/or other services. RAN 120 may also be referred to as an Evolved Universal Terrestrial Radio Access Network (E-UTRAN).

RAN 120 may include a number of evolved Node Bs (eNBs) that support radio communication for UEs. For simplicity, only two eNBs 130 and 132 are shown in FIG. 1. An eNB may be an entity that communicates with the UEs and may also be referred to as a Node B, a base station, an access point, etc. Each eNB may provide communication coverage for a particular geographic area and may support radio communication for the UEs located within the coverage area. To improve network capacity, the overall coverage area of an eNB may be partitioned into multiple (e.g., three) smaller areas. Each smaller area may be served by a respective eNB subsystem. In 3GPP, the term "cell" can refer to a coverage area of an eNB and/or an eNB subsystem serving this coverage area. RAN 120 may also include other network entities that are not shown in FIG. 1 for simplicity.

Core network 140 may include a Mobility Management Entity (MME) 142, a Home Subscriber Server (HSS) 144, a serving gateway (SGW) 146, and a Packet Data Network (PDN) gateway (PGW) 148. Core network 140 may also include other network entities that are not shown in FIG. 1 for simplicity.

MME 142 may perform various functions such as control of signaling and security for a Non Access Stratum (NAS), authentication and mobility management of UEs, selection of gateways for UEs, bearer management functions, etc. HSS 144 may store subscription-related information (e.g., user profiles) and location information for users, perform authentication and authorization of users, and provide information about user location and routing information when requested.

Serving gateway 146 may perform various functions related to Internet Protocol (IP) data transfer for UEs such as data routing and forwarding, mobility anchoring, etc. Serving gateway 146 may also terminate the interface towards RAN 120 and may perform various functions such as support for handover between eNBs, buffering, routing and forwarding of data for UEs, initiation of network-triggered service request procedure, accounting functions for charging, etc.

PDN gateway 148 may perform various functions such as maintenance of data connectivity for UEs, IP address allocation, packet filtering for UEs, service level gating control and rate enforcement, dynamic host configuration protocol (DHCP) functions for clients and servers, gateway GPRS support node (GGSN) functionality, etc. PDN gateway 148 may also terminate an SGi interface toward a packet data network 190, which may be the Internet, a packet data network of a network operator, etc. SGi is a reference point between a PDN gateway and a packet data network for provision of data services.

FIG. 1 also shows exemplary interfaces between various network entities in RAN 120 and core network 140. eNBs 130 and 132 may communicate with each other via an X2 interface. eNBs 130 and 132 may communicate with MME 142 via an S1-MME interface and with serving gateway 146 via an S1-U interface. MME 142 may communicate with HSS 144 via an S6a interface and may communicate with serving gateway 146 via an S11 interface. Serving gateway 146 may communicate with PDN gateway 148 via an S5 interface.

The various network entities in RAN 120 and core network 140 and the interfaces between the network entities are described in 3GPP TS 36.300, entitled "Evolved Universal Terrestrial Radio Access (E-UTRA) and Evolved Universal Terrestrial Radio Access Network (E-UTRAN); Overall description," and in 3GPP TS 23.401, entitled "General Packet Radio Service (GPRS) enhancements for Evolved Universal Terrestrial Radio Access Network (E-UTRAN) access." These documents are publicly available from 3GPP.

A UE 110 may communicate with one or more eNBs at any given moment for radio communication. UE 110 may be stationary or mobile and may also be referred to as a mobile station, a terminal, an access terminal, a subscriber unit, a station, etc. UE 110 may be a cellular phone, a smartphone, a tablet, a wireless communication device, a personal digital assistant (PDA), a wireless modem, a handheld device, a laptop computer, a cordless phone, a wireless local loop (WLL) station, a netbook, a smartbook, etc.

Wireless network 100 may support operation on multiple carriers, which may be referred to as carrier aggregation or multi-carrier operation. UE 110 may be configured with multiple carriers for the downlink and one or more carriers for the uplink for carrier aggregation. One or more eNBs may transmit data and/or control information on one or more carriers to UE 110. UE 110 may transmit data and/or control information on one or more carriers to one or more eNBs.

Wireless network 100 may support communication via a user plane and a control plane. A user plane is a mechanism for carrying data for higher-layer applications and employing a user-plane bearer, which is typically implemented with standard protocols such as User Datagram Protocol (UDP), Transmission Control Protocol (TCP), and Internet Protocol (IP). A control plane is a mechanism for carrying data (e.g., signaling) and is typically implemented with network-specific protocols, interfaces, and signaling messages such as Non Access Stratum (NAS) messages and Radio Resource Control (RRC) messages. For example, traffic/packet data may be sent between UE 110 and wireless network 100 via the user plane. Signaling for various procedures to support communication for UE 110 may be sent via the control plane.

UE 110 may be configured with multiple data bearers for data communication with carrier aggregation. A bearer may refer to an information transmission path of defined characteristics, e.g., capacity, delay, bit error rate, etc. A data bearer is a bearer for exchanging data and may terminate at a UE and a network entity (e.g., a PDN gateway) designated to route data for the UE. A data bearer may also be referred to as an Evolved Packet System (EPS) bearer in LTE, etc. A data bearer may be established when UE 110 connects to a designated network entity (e.g., a PDN gateway) and may remain established throughout the lifetime of the connection in order to provide UE 110 with always-on IP connectivity. This data bearer may be referred to as a default data bearer. One or more additional data bearers may be established to the same network entity (e.g., the same PDN gateway) and may be referred to as dedicated data bearer(s). Each additional data bearer may be associated with various characteristics such as (i) one or more traffic flow templates (TFTs) used to filter packets to be sent via the data bearer, (ii) quality-of-service (QoS) parameters for data transfer between the UE and the designated network entity, (iii) packet forwarding treatment related to scheduling policy, queue management policy, rate shaping policy, Radio Link Control (RLC) configuration, etc., and/or (iv) other characteristics. For example, UE 110 may be configured with one data bearer for transfer of data for a Voice-over-IP (VoIP) call, another data bearer for Internet download traffic, etc. In summary, a default data bearer may be established with each new data connection (e.g., each new PDN connection) and its context may remain established throughout the lifetime of the data connection. The default data bearer may be a non-guaranteed bit rate (GBR) bearer. A dedicated data bearer may be associated with uplink packet filters in a UE and downlink packet filters in a designated network (e.g., a PDN gateway), where the filters may only match certain packets. Each data bearer may correspond to a radio bearer. The default data bearer may typically be best effort and may carry all packets for an IP address that do not match the packet filters of any of the dedicated data bearers. The dedicated data bearers may typically be associated with traffic of a specific type (e.g., based on the packet filters) and may be associated with certain QoS.

In an aspect of the present disclosure, multiple data bearers may be configured for UE 110 for carrier aggregation and may be split among multiple eNBs, which may be referred to as bearer level splitting. eNBs may be selected to serve the multiple data bearers of UE 110 based on various criteria such as channel conditions, loading, etc. In one design, eNBs may be selected to serve data bearers of UE 110 on a per data bearer basis, so that a particular eNB may be selected to serve each data bearer of UE 110. Each data packet for UE 110 may be sent via an appropriate data bearer based on a TFT associated with each data bearer. Bearer level splitting may be supported in various manners and with various network architectures.

Figure 2:
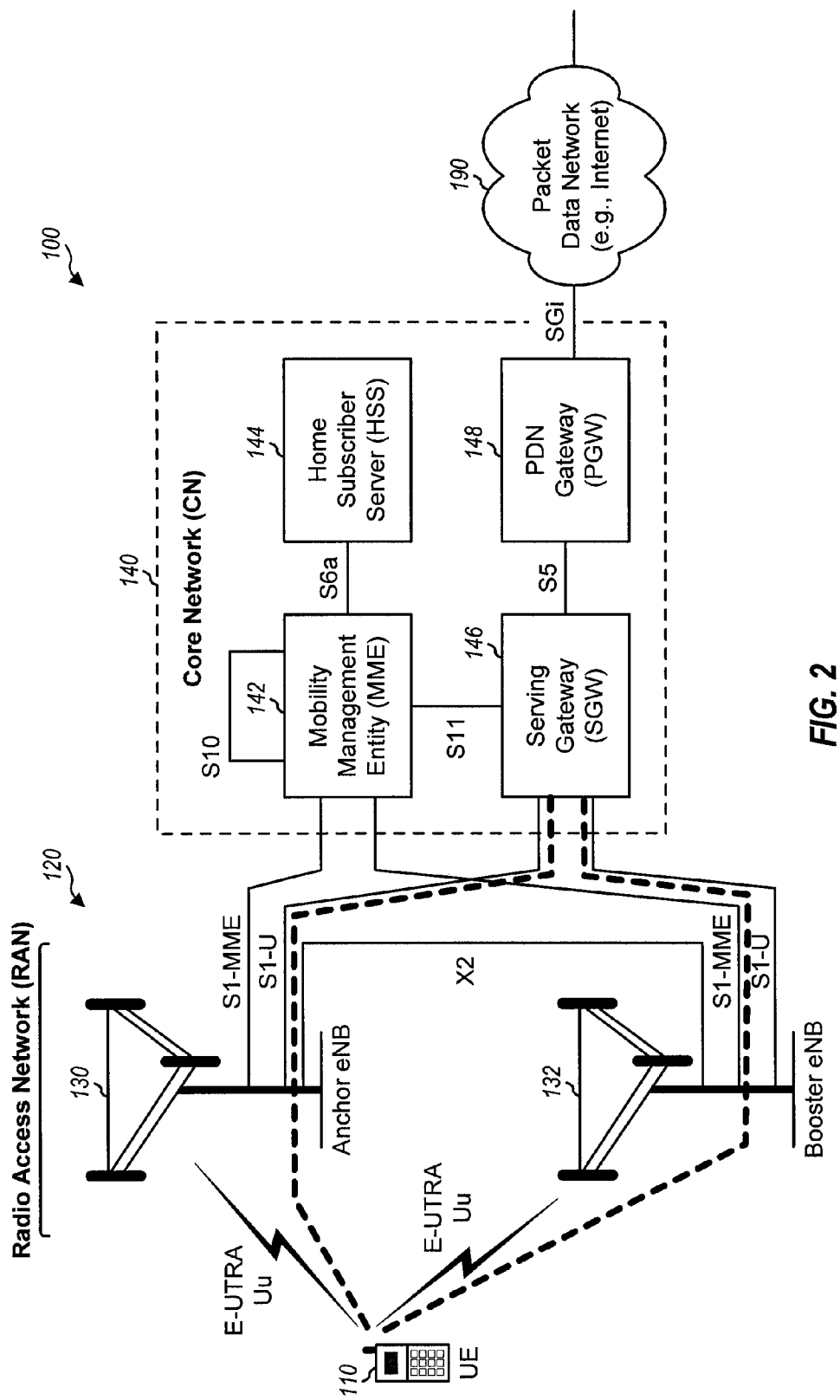
FIG. 2 is a block diagram illustrating an exemplary design of bearer level splitting with data bearers terminating at the core network.

FIG. 2 shows an exemplary design of bearer level splitting with data bearers terminating at core network 140. UE 110 may communicate with multiple eNBs 130 and 132 for carrier aggregation. eNB 130 may be an anchor eNB for UE 110, and eNB 132 may be a booster eNB for UE 110. An anchor eNB may be an eNB designated to control communication for a UE. An anchor eNB may also be referred to as a serving eNB, a primary eNB, a main eNB, etc. A booster eNB may be an eNB selected to exchange data with a UE, e.g., transmit data to and/or receive data from the UE. A booster eNB may also be referred to as a secondary eNB, a supplemental eNB, etc.

UE 110 may be configured with multiple data bearers for carrier aggregation. At least one of the multiple data bearers may be served by anchor eNB 130, and remaining ones of the multiple data bearers may be served by booster eNB 132. Each data bearer of UE 110 may thus be served by one eNB for UE 110. MME 142 may manage the data bearers of UE 110 and may determine which data bearers of UE 110 are served by which eNBs, e.g., using methods defined in LTE Release 8, except that the tunnel endpoints for the data bearers are now at different eNBs instead of a single eNB. MME 142 may send Modify Bearer Request messages to affected network entities (e.g., serving gateway 146) to change eNBs serving the data bearers of UE 110.

For data transmission on the downlink, PDN gateway 148 may receive data intended for UE 110 and may separate the data into different data bearers of UE 110. PDN gateway 148 may forward the data for UE 110 to serving gateway 146, which may forward the data to appropriate eNBs based on a Modify Bearer Request message from MME 142.

For data transmission on the uplink, each eNB may receive data from UE 110 and may forward the data to serving gateway 146 via an appropriate data bearer. Serving gateway 146 may forward the data for all data bearers of UE 110 to PDN gateway 148.

For bearer level splitting with data bearers terminating at core network 140, no changes may be needed to serving gateway 146 or PDN gateway 148. MME 142 may be modified for a new type of Path Switch Request (e.g., a Bearer Switch Request), which may impact only a portion of the data bearers of UE 110.

Figure 3:
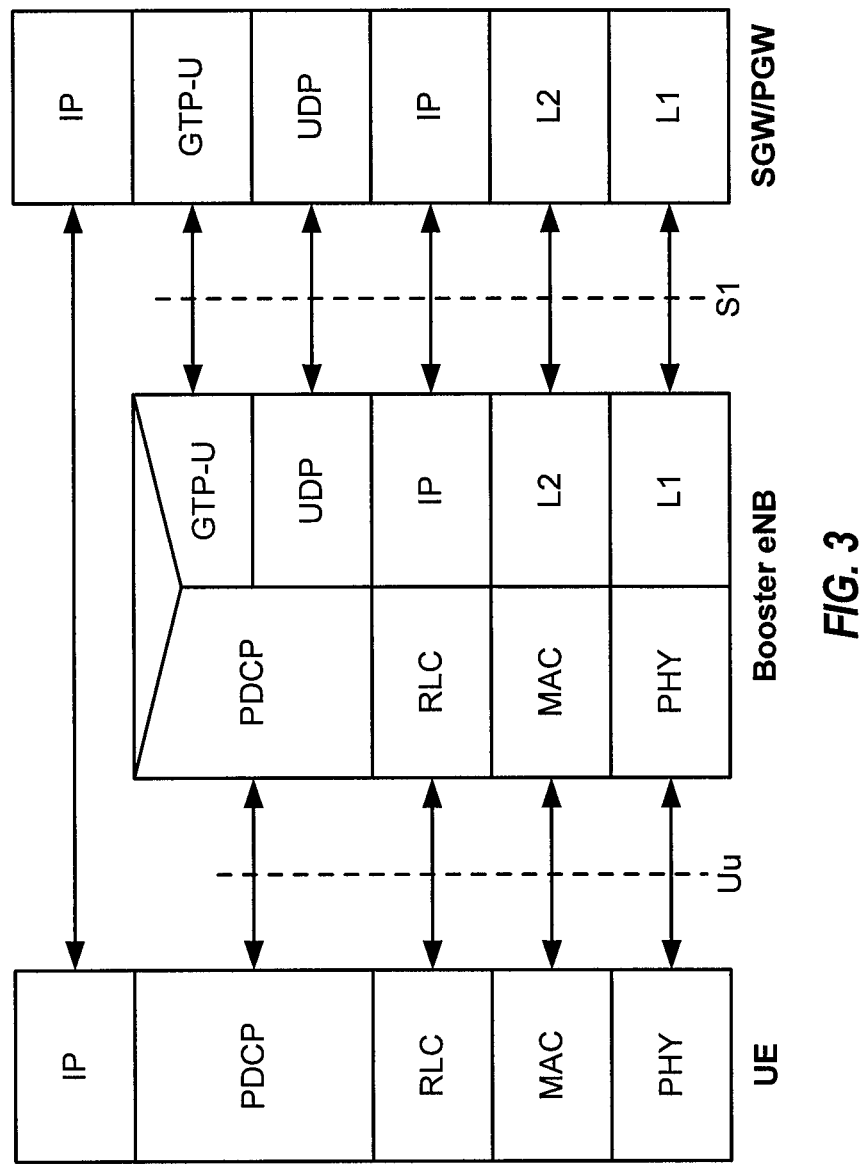
FIG. 3 is a block diagram illustrating exemplary protocol stacks for the user plane for communication between a UE and a PDN gateway based on the network architecture shown in FIG. 2.

FIG. 3 shows exemplary protocol stacks for the user plane for communication between UE 110 and PDN gateway 148 based on the network architecture shown in FIG. 2. UE 110 may exchange (e.g., transmit and/or receive) data with PDN gateway 148 via IP. At UE 110, IP may operate over (i) Packet Data Convergence Protocol (PDCP), Radio Link Control (RLC), and Medium Access Control (MAC) in Layer 2 (L2) and (ii) E-UTRA air-link in physical layer (PHY)/Layer 1 (L1). Booster eNB 132 may communicate with serving gateway 146 via GPRS Tunneling Protocol for User Plane (GTP-U), UDP, IP, L2 and L1.

The user plane for UE 110 via booster eNB 132 in FIG. 3 may be similar to the user plane for UE 110 via a conventional eNB in LTE Release 8. The user plane for UE 110 via anchor eNB 130 may be similar to the user plane for UE 110 via booster eNB 132.

Figure 4:
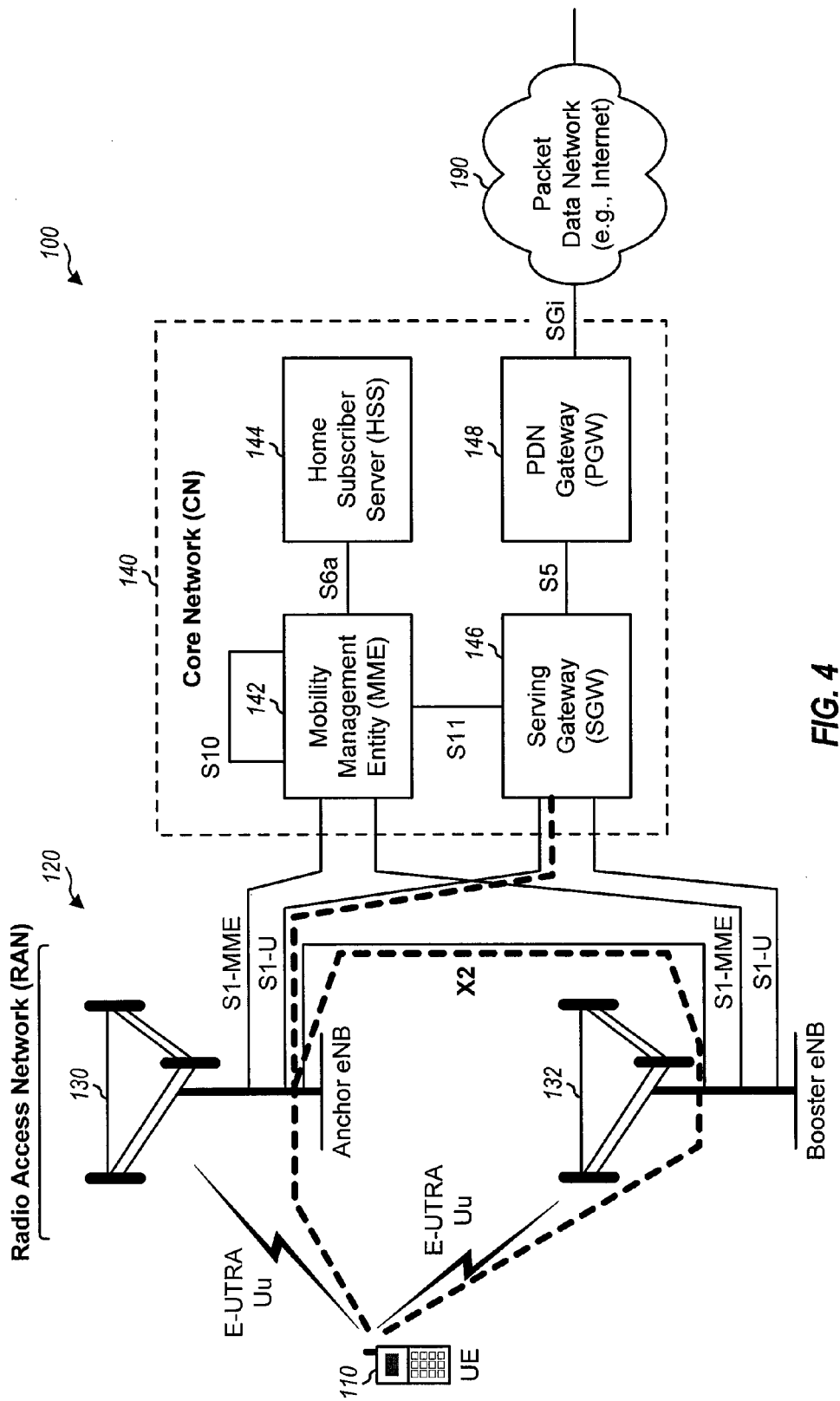
FIG. 4 is a block diagram illustrating an exemplary design of bearer level splitting with data bearers terminating at the RAN.

FIG. 4 shows an exemplary design of bearer level splitting with data bearers terminating at RAN 120. UE 110 may communicate with multiple eNBs 130 and 132 for carrier aggregation and may be configured with multiple data bearers for carrier aggregation. At least one of the multiple data bearers may be served by anchor eNB 130, and remaining ones of the multiple data bearers may be served by booster eNB 132. Anchor eNB 130 may act as an anchor for the data plane aggregating data of UE 110 sent via booster eNB 132. In one design, PDCP may terminate at booster eNB 132. A single S1 interface between anchor eNB 130 and serving gateway 146 may be used for all data bearers of UE 110. The mapping of data bearers to eNBs may be hidden from core network 140, which may operate in the same manner as if all data bearers of UE 110 are served by only eNB 130. For bearer level splitting with data bearers terminating at the RAN, no changes may be needed for network entities in the core network since mobility to and from booster eNBs may be hidden from the core network.

For data transmission on the downlink, PDN gateway 148 may receive data intended for UE 110 and may separate the data into different data bearers of UE 110. PDN gateway 148 may forward the data for UE 110 to serving gateway 146, which may forward the data to anchor eNB 130. Anchor eNB 130 may identify and separate data for data bearers of UE 110 served by anchor eNB 130 and data for data bearers of UE 110 served by booster eNB 132. Anchor eNB 130 may forward the data for the data bearers served by booster eNB 132 to the booster eNB via X2-U interface. For data transmission on the downlink, the operation performed by anchor eNB 130 may be similar to operations performed by an eNB for handover of UE 110 to booster eNB 132. However, for bearer level splitting, anchor eNB 130 may continue to forward data for UE 110 to booster eNB 132 for the duration of the connection of UE 110 at booster eNB 132.

For data transmission on the uplink, anchor eNB 130 may receive data sent by UE 110 via data bearers served by anchor eNB 130. Booster eNB 132 may receive data sent by UE 110 via the data bearers served by booster eNB 132 and may forward the data to anchor eNB 130 via the X2-U interface.

Figure 5:
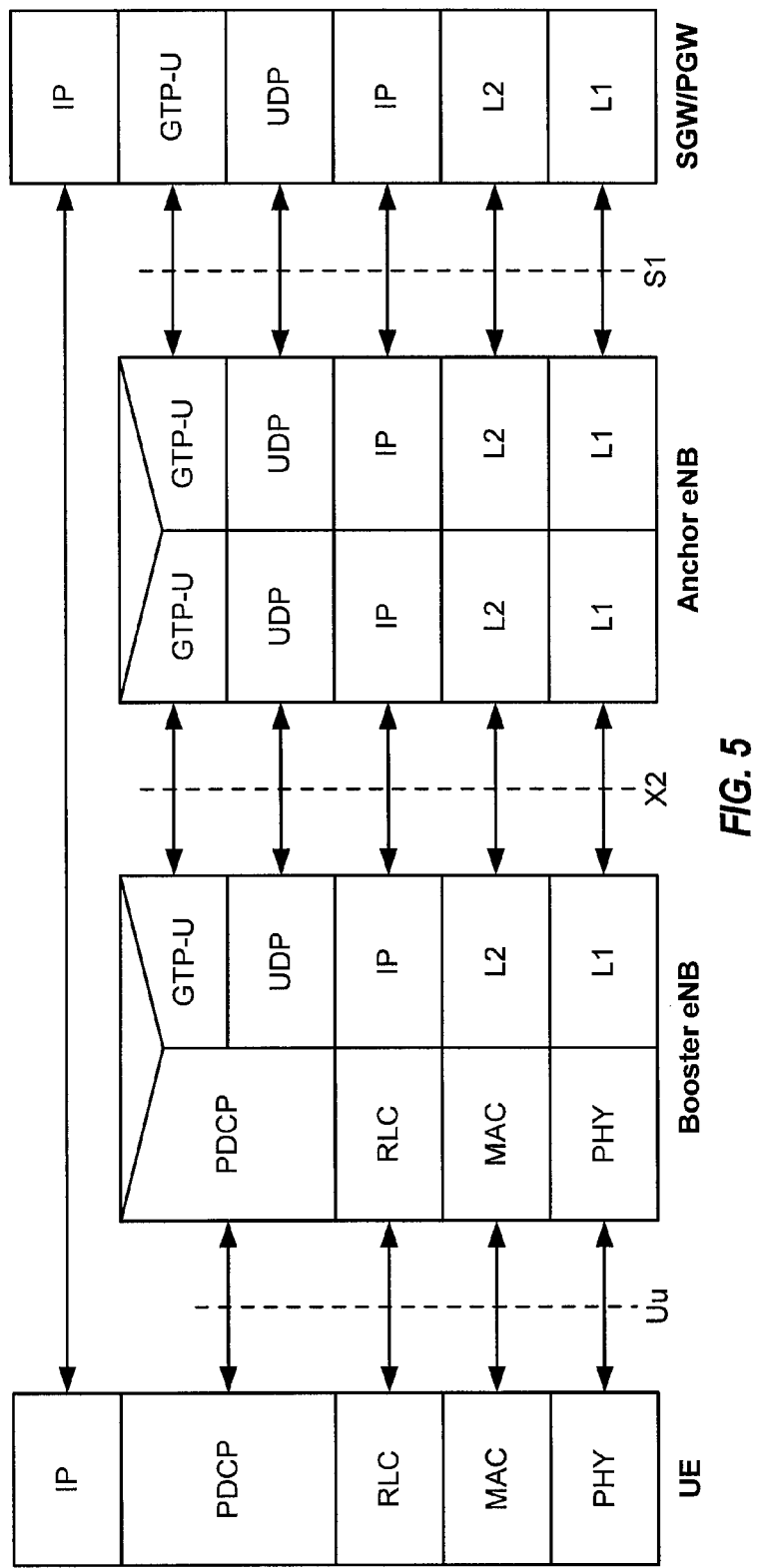
FIG. 5 is a block diagram illustrating exemplary protocol stacks for the user plane for communication between a UE and a PDN gateway via different eNBs based on the network architecture shown in FIG. 4.

FIG. 5 shows exemplary protocol stacks for the user plane for communication between UE 110 and PDN gateway 148 via eNBs 130 and 132 based on the network architecture shown in FIG. 4. UE 110 may exchange data with PDN gateway 148 via IP. At UE 110, IP may operate over PDCP, RLC, MAC, and PHY. Booster eNB 132 may communicate with anchor eNB 130 via GTP-U, UDP, IP, L2 and L1. Similarly, anchor eNB 130 may communicate with serving gateway 146 via GTP-U, UDP, IP, L2 and L1.

The user plane for UE 110 via anchor eNB 130 may be similar to the user plane for UE 110 via booster eNB 132 in FIG. 3, which may be similar to the user plane for UE 110 via a conventional eNB in LTE Release 8. The user plane for UE 110 via anchor eNB 130 may be the same as the user plane for UE 110 via booster eNB 132. On the downlink, the user plane for UE 110 via booster eNB 132 may be similar to the user plane for UE 110 via a conventional eNB in LTE Release 8 for data packets sent to anchor eNB 130 that are forwarded to booster eNB 132.

Figure 6:
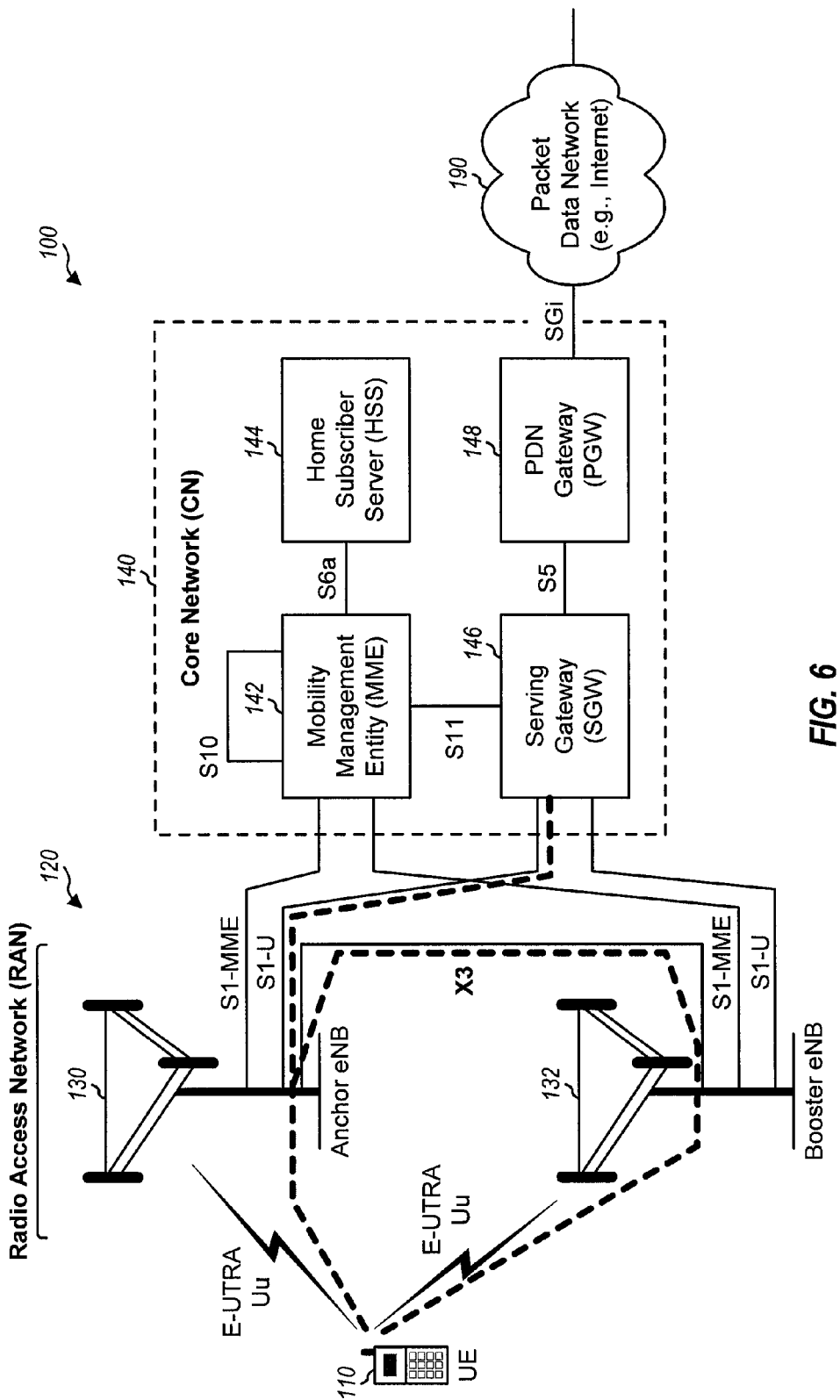
FIG. 6 is a block diagram illustrating an exemplary design of bearer level splitting with data bearers terminating at the RAN.

FIG. 6 shows an exemplary design of bearer level splitting with data bearers terminating at RAN 120. The design in FIG. 6 is similar to the design in FIG. 4, except that PDCP is terminated at anchor eNB 130 in FIG. 6 (instead of at booster eNB 132 in FIG. 4). Booster eNB 132 may be considered as a cell with regard to UE 110 since it does not terminate PDCP for UE 110 and is not a full eNB to UE 110.

For data transmission on the downlink, PDN gateway 148 may receive data intended for UE 110 and may separate the data into different data bearers of UE 110. PDN gateway 148 may forward the data for UE 110 to serving gateway 146, which may forward the data to anchor eNB 130. Anchor eNB 130 may identify and separate data for data bearers served by anchor eNB 130 and data for offloaded data bearers served by booster eNB 132. Anchor eNB 130 may process data for the offloaded data bearers for PDCP and may send the processed data to booster eNB 132 via an X3-U interface. For data transmission on the uplink, booster eNB 132 may receive data sent by UE 110 on the offloaded data bearers and may forward the data to anchor eNB 130 via the X3-U interface. X3-U may be a new data plane interface between anchor eNB 130 and booster eNB 132 and may carry PDCP protocol data units (PDUs) on the uplink and downlink over GTP For bearer level splitting with data bearers terminating at RAN 120 with PDCP terminated at anchor eNB 130, security for the Uu interface may be terminated at anchor eNB 130. Radio Resource Control (RRC) may be terminated at anchor eNB 130. In case of handover of UE 110 to another eNB, buffered data for PDCP may be available at anchor eNB 130.

Figure 7:
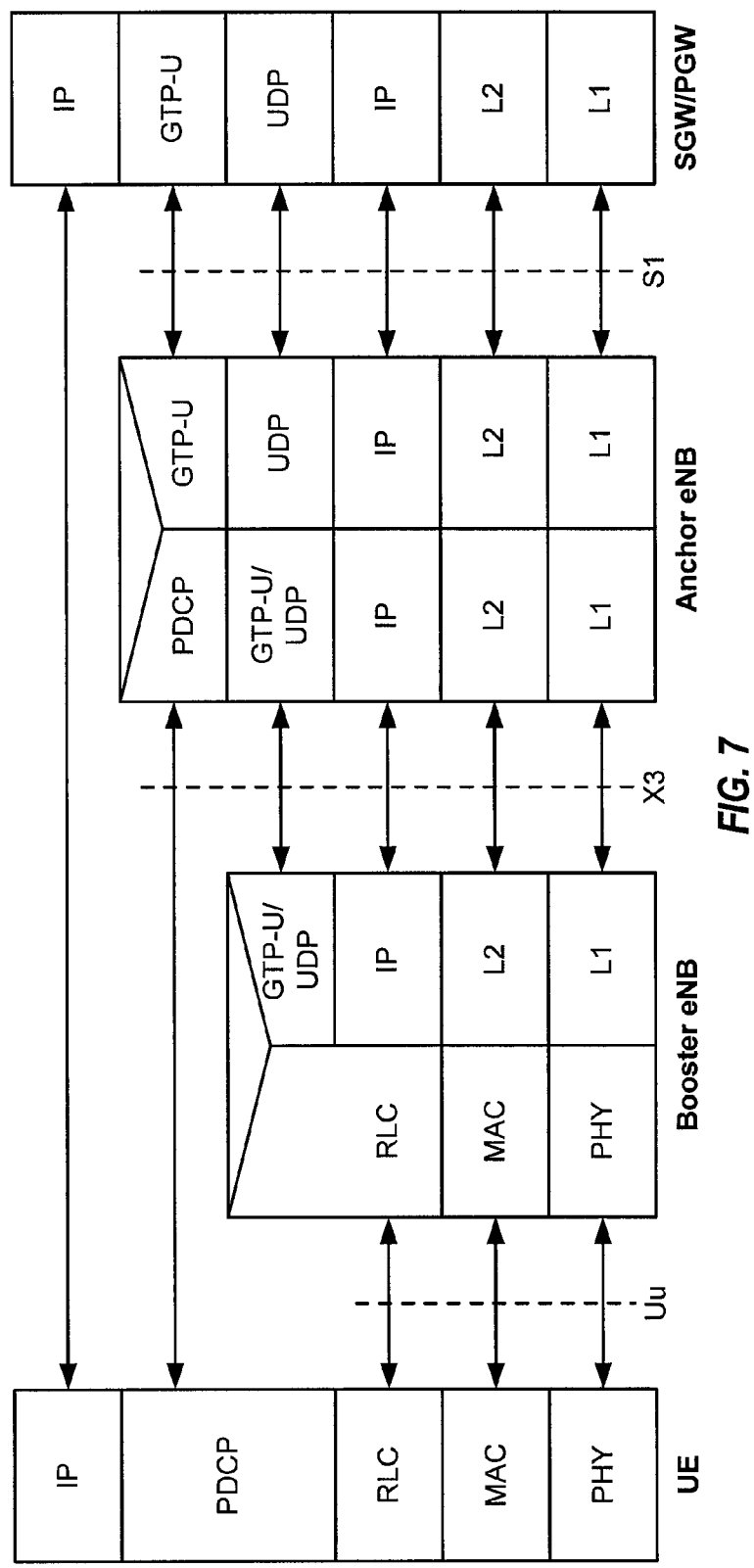
FIG. 7 is a block diagram illustrating exemplary protocol stacks for the user plane for communication between a UE and a PDN gateway 48 via different eNBs based on the network architecture shown in FIG. 6.

FIG. 7 shows exemplary protocol stacks for the user plane for communication between UE 110 and PDN gateway 148 via eNBs 130 and 132 based on the network architecture shown in FIG. 6. UE 110 may exchange data with PDN gateway 148 via IP. At UE 110, IP may operate over PDCP, RLC, MAC, and PHY. PDCP may terminate at anchor eNB 130 whereas RLC, MAC, and PHY may terminate at booster eNB 132. Booster eNB 132 may communicate with anchor eNB 130 via GTP-U, IP, L2 and L1. Anchor eNB 130 may communicate with serving gateway 146 via GTP-U, UDP, IP, L2 and L1. The user plane for UE 110 via anchor eNB 130 may be the same as the user plane for UE 110 via booster eNB 132 in FIG. 3, which may be similar to the user plane for UE 110 via a conventional eNB in LTE Release 8.

Figure 8:
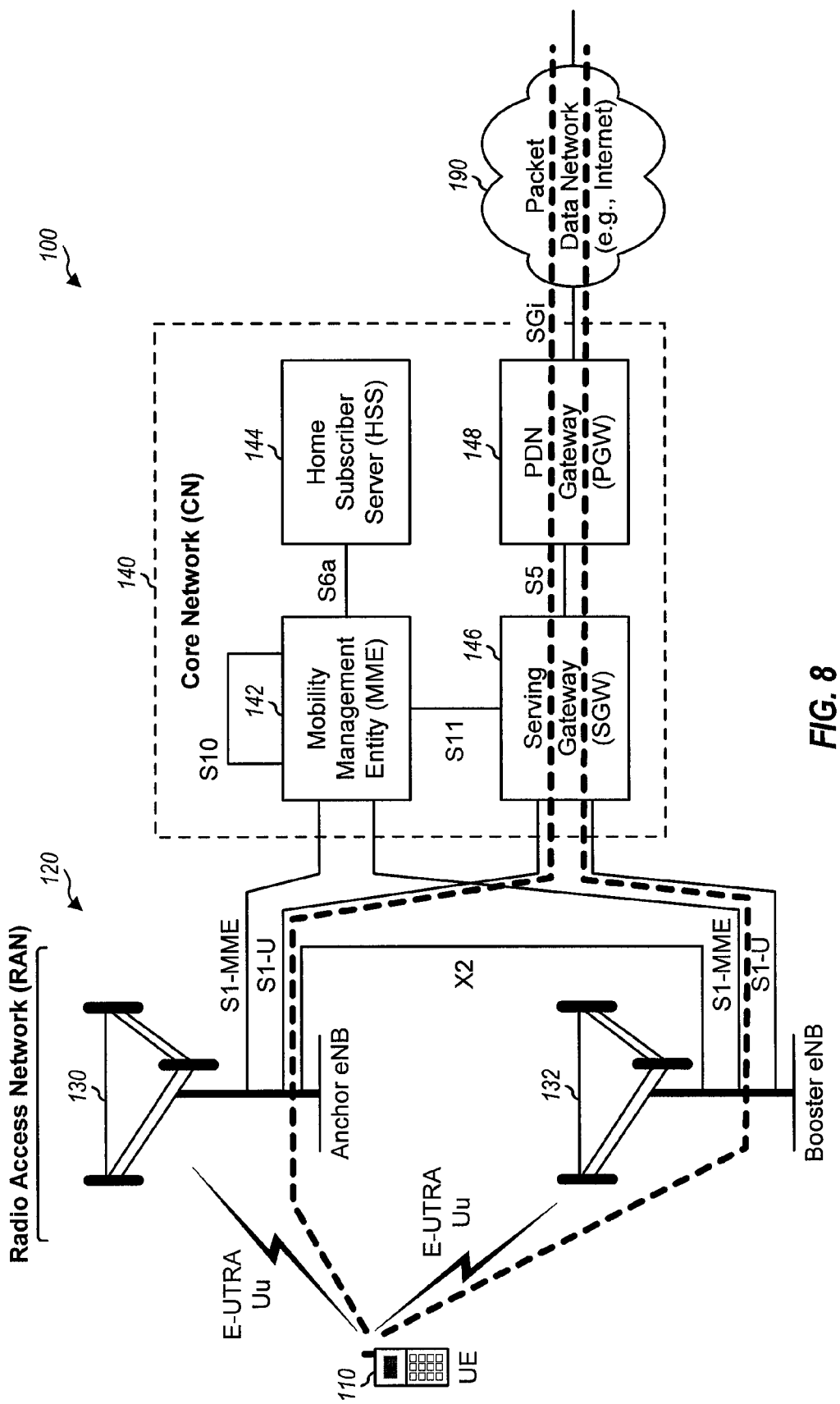
FIG. 8 is a block diagram an exemplary design of bearer level splitting with separate data connections in the core network.

FIG. 8 shows an exemplary design of bearer level splitting with separate data connections in core network 140. A data connection is a data path between two entities exchanging data. A data connection may also be referred to as a PDN connection, etc. A data connection may be associated with various characteristics such as an IP address used to send data to an entity terminating the data connection. The IP address may correspond to a packet data network (PDN) requested by a UE for a type of access. For example, the UE may request an Access Point Name (APN) that corresponds to a type of access such as Internet, voice, operator services, local breakout, etc. Based on the name, an MME may select a PDN that can provide the type of access requested by the UE and then, through a series of procedures defined in TS 23.401, the UE may be assigned an IP address corresponding to that PDN. The PDN may then have one or more associated data bearers so the UE can perform QoS for traffic related to that PDN.

Bearer level splitting with separate data connections may be used to support multipath TCP. TCP typically assumes in-order delivery of data. If a UE sends packets using multiple IP addresses (e.g., for WLAN interface and cellular), then a mechanism is needed to (a) support a TPC client having multiple interfaces and (b) deal with packet loss separately on each interface. Multipath TCP is a method of TCP defined by IETF which allows a TCP client to have multiple IP addresses with respect to a TCP server.

In one design of bearer level splitting with separate data connections, the data bearers of UE 110 for each eNB may correspond to a separate data connection at PDN gateway 148. For example, data bearers of UE 110 served by anchor eNB 130 may correspond to a first data connection associated with a first IP address assigned to UE 110, and data bearers of UE 110 served by booster eNB 132 may correspond to a second data connection associated with a second IP address assigned to UE 110. In contrast, for the design in FIG. 2, all data bearers of UE 110 may correspond to a single data connection at PDN gateway 148.

In one design, a common serving gateway may be used (depending on the control plane) for all data connections of UE 110. This design may simplify bearer management for each data connection as data bearers are activated, de-activated, and/or changed. In another design, different serving gateways may be used for different data connections of UE 110.

In one design, a single PDN gateway may terminate all data connections of UE 110, e.g., as shown in FIG. 8. In another design, different PDN gateways may terminate different data connections of UE 110 since (i) UE 110 may be assigned a separate IP address at each eNB and (ii) the data connections for UE 110 may be independent in the data plane.

Table 1 summarizes various characteristics of bearer level splitting for the three exemplary designs shown in FIGS. 2, 4 and 6.

TABLE 1

Bearer Level Splitting

| Evaluation criteria | Data bearers terminated at core network | Data bearers terminated at RAN via X2 - PDCP terminated at booster eNB | Data bearers terminated at RAN via X3 - PDCP terminated at anchor eNB |
|---|---|---|---|
| Impact to core network | MME is updated to handle per bearer handover. No changes to PGW/SGW. | None | None |
| Anchor eNB data plane functions | Normal eNB functions for data bearers served by anchor eNB. | Normal eNB functions for served data bearers. Forward data for offloaded data bearers via X2 to booster eNB. Received data via X2 from booster eNB and forward to SGW. | New X3 interface with booster eNB. Forward data for offloaded data bearers via X3 to booster eNB. Received data via X3 from booster eNB and forward to SGW. |
| Booster eNB data plane functions | Normal eNB functions for data bearers served by booster eNB. | Receive downlink data for offloaded data bearers from anchor eNB via X2. Forward uplink data for offloaded data bearers to anchor eNB via X2. | Receive downlink data for offloaded data bearers from anchor eNB via X3. Forward uplink data for offloaded data bearers to anchor eNB via X3. |
| Anchor - booster interface | Control plane plus initial X2-U forwarding from anchor eNB as part of bearer establishment at booster eNB. | Control plane plus X2-U forwarding from anchor eNB for duration of offloaded data bearers served at booster eNB. | Control plane plus X3 forwarding from anchor eNB for duration of offloaded data bearers served at booster eNB. |

TABLE 1-continued

Bearer Level Splitting

| Evaluation criteria | Data bearers terminated at core network | Data bearers terminated at RAN via X2 - PDCP terminated at booster eNB | Data bearers terminated at RAN via X3 - PDCP terminated at anchor eNB |
|---|---|---|---|
| Routing efficiency | Good routing efficiency on downlink and uplink as packets are sent directly to SGW. | Routing efficiency is dependent on routing path between anchor eNB and booster eNB. Routing bottleneck, if present, will be at anchor eNB and not booster eNB. | Routing efficiency is dependent on routing path between anchor eNB and booster eNB. Routing bottleneck, if present, will be at anchor eNB and not booster eNB. |
| Security | Common or independent security for each eNB. Anchor eNB is aware of security keys for booster eNB. CN may be updated to support independent security for more than one booster eNB. | Common or independent security for anchor eNB and set of booster eNBs. Anchor eNB is aware of security keys for booster eNB. | All security at anchor eNB. Encrypted data sent on data plane between anchor eNB and UE via booster eNB. Better if booster eNB is not trusted. |
| Coexistence between standalone flow and multi-flow at booster eNB | Low complexity. Common data plane - no difference between UE being served by standalone eNB or booster eNB. | Medium complexity. Mostly common data plane - UE being served as standalone eNB is sent in S1-U vs. UE being served as booster eNB is sent in X2-U but both are via same GTP protocol. | Higher complexity. Separate data plane - UE being served as standalone eNB is sent in S1-U vs. UE being served as booster eNB would forward data packets to anchor eNB for PDCP. |

Data bearers may be terminated at the core network or the RAN, and this choice may be selected based on various criteria such as routing efficiency, impact to the core network, etc. Routing efficiency may also be dependent on how the anchor eNB and booster eNBs are connected in an actual deployment. PDCP may be terminated in the anchor eNB or the booster eNB, and this choice may be selected based on various factors such as whether security and RRC are terminated at the anchor eNB or the booster eNB.

UE 110 may communicate with multiple eNBs for carrier aggregation, e.g., as shown in FIGS. 1, 2, 4, 6 and 8. From the perspective of UE 110, each eNB that serves data bearers of UE 110 may be considered as a cell. One cell may be designated as a primary cell (Pcell) for UE 110, and each remaining cell may be considered as a secondary cell (Scell) for UE 110. LTE Release 10 supports carrier aggregation from one or more cells in the same eNB, and coordination among all cells serving UE 110 for carrier aggregation may be possible due to the cells being collocated at the same eNB.

Multiple data bearers may be configured for UE 110 for carrier aggregation and may be referred to as bearer level aggregation. Bearer level aggregation may be combined with carrier aggregation of cells in the same eNB defined in LTE Release 10. In particular, UE 110 may be served by multiple cells for carrier aggregation, which may include (i) a first subset of cells in the same eNB and (ii) a second subset of cells non-collocated with the first subset of cells (and possibly utilizing a different radio access technology) at a different eNB. The first subset of cells may conform to carrier aggregation rules defined in LTE Release 10. Bearer level aggregation may be applied to the second subset of cells. The functionality of the multiple cells serving UE 110 may be disjoint at lower layers due to latency between eNBs to which these cells belong.

Several aspects of carrier aggregation in LTE Release 10 may be updated to enable independent cell operation for carrier aggregation. For transmission of control information on the uplink, hybrid automatic retransmission (HARQ) feedback and periodic channel state information (CSI) feedback from UE 110 may be transmitted to a single cell (e.g., the primary cell). Bearer level aggregation may support transmission of control information on the uplink to each cell, so that each cell may operate in similar manner as for single-carrier operation. UE 110 may be assigned multiple Physical Uplink Control Channels (PUCCHs) for transmission of control information on the uplink, e.g., one PUCCH for each cell. UE 110 may perform random access on only the primary cell, e.g., as defined in LTE Release 10. Alternatively, UE 110 may perform random access on the primary and secondary cells. UE 110 may be configured for discontinuous transmission (DTX) by multiple cells such that good performance can be obtained. A single MAC PDU may activate/deactivate multiple cells, e.g., as defined in LTE Release 10. Some coordination among cells may be established to enable multiple cells to be activated/deactivated by a single MAC PDU. Separate RLC may be used for each cell serving UE 110, which is different from a single RLC for all cells in LTE Release 10. Separate RRC may be used for each cell serving UE 110, which is different from a single RRC for all cells in LTE Release 10.

Call flows for various procedures may be defined to support bearer level splitting. Some exemplary call flows are described below.

Figure 9:
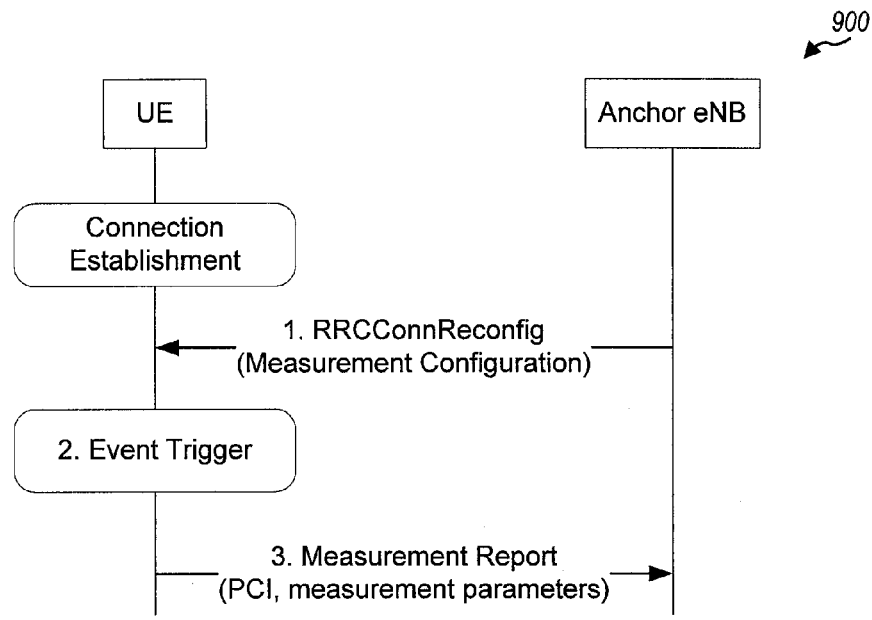
FIG. 9 is a call flow diagram illustrating a call flow for a measurement procedure for identifying booster eNBs with a known physical cell identity (PCI)-to-cell global identity (CGI) mapping.

FIG. 9 shows a call flow 900 for a measurement procedure for identifying booster eNBs with a known physical cell identity (PCI)-to-cell global identity (CGI) mapping. In LTE, each cell may be associated with a PCI and a CGI. A PCI is a 9-bit value that is unique for a cell in a particular geographic area. A CGI is unique for a cell among all cells in an LTE network. Anchor eNB 130 may provide a measurement configuration to UE 110, e.g., when a connection is established by UE 110 or based on some event (step 1). The measurement configuration may convey (i) criteria in which UE 110 should make measurements of cells and/or (ii) criteria in which UE 110 should report measurement results of cells to anchor eNB 130. UE 110 may be directed to make measurements periodically and/or when triggered by certain events based on the measurement configuration. UE 110 may make measurements of cells in response to a trigger event (step 2). UE 110 may then send a Measurement Report message to anchor eNB 130. The Measurement Report message may include measurement results and PCIs (but not CGIs) of measured cells. The measurement results may be for received signal strength/received power, received signal quality, pathloss, geometry, etc. The measured cells may be uniquely identified based on the reported PCIs and a known PCI-to-CGI mapping for these cells. Anchor eNB 130 may determine the PCI-to-CGI mapping due to automatic neighbor relations (ANR) or based on configuration. ANR allows an eNB to find out who its neighbors are and is described in 3GPP 36.300, Section 22.3.2a. If a UE reports a PCI of a target eNB that a source eNB does not have information for, then the source eNB may request the UE to read SIB1 of the target eNB for the reported PCI and find out cell ID, tracking area, etc. The source eNB may then use this information to route HOs to the target eNB and may also use ANR procedures to find out an IP address of the target eNB to establish an X2 connection. Booster eNBs may be selected for UE 110 based on the measurement results and/or other information.

Figure 10:
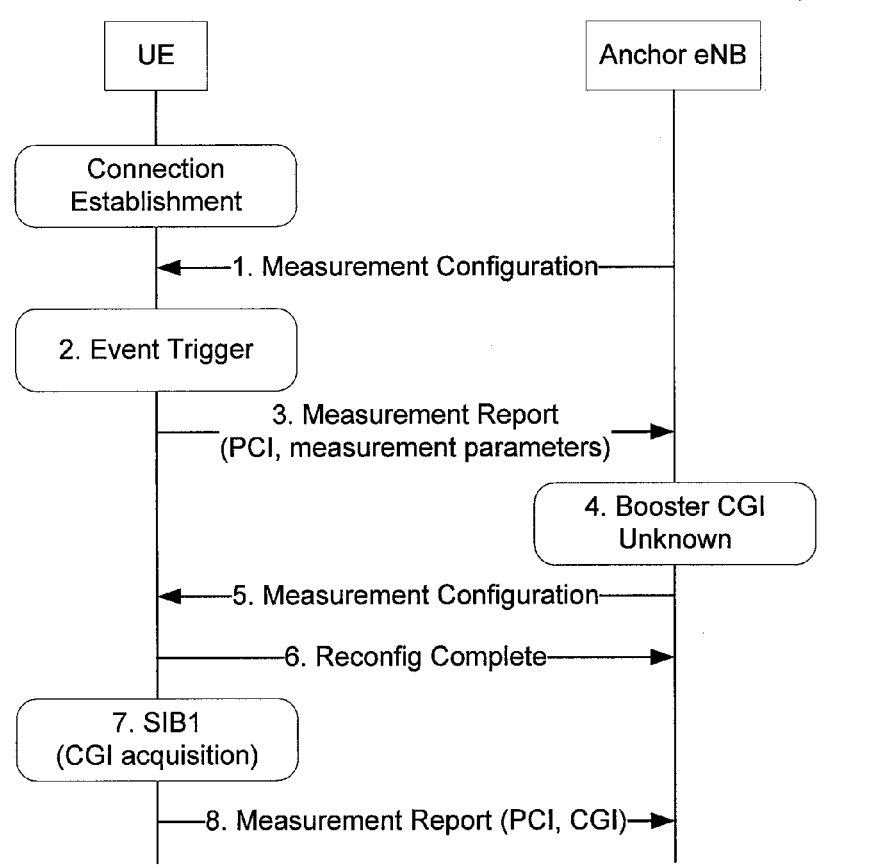
FIG. 10 is a call flow diagram illustrating a call flow for a measurement procedure for identifying booster eNBs with an unknown PCI-to-CGI mapping.

FIG. 10 shows a call flow 1000 for a measurement procedure for identifying booster eNBs with an unknown PCI-to-CGI mapping. Anchor eNB 130 may provide a measurement configuration to UE 110, e.g., when a connection is established by UE 110 or based on some event (step 1). UE 110 may make measurements of cells in response to a trigger event (step 2). UE 110 may then send a Measurement Report message, which may include measurement results and PCIs (but not CGIs) of measured cells, to anchor eNB 130 (step 3). Anchor eNB 130 may not know the CGIs of one or more measured cells based on the reported PCIs (step 4). This may be due to the presence of many cells (which may result in PCI confusion) or the presence of dynamic cells (where the PCIs can change or cells can appear suddenly).

Anchor eNB 130 may then send a connection reconfiguration message, such as RRCConnectionReconfiguration message, to UE 110 (step 5). This RRC message may include a list of PCIs of cells for which CGIs should be reported by UE 110. Anchor eNB 130 may assign a measurement gap pattern for UE 110 to acquire system information block type 1 (SIB1) of each cell for which CGI should be reported. UE 110 may return a connection reconfiguration complete message, such as RRCConnectionReconfiguration-Complete message, to anchor eNB 130 (step 6). UE 110 may read system information, such as from SIB1, of each cell for which CGI should be reported (e.g., during measurement gaps assigned by anchor eNB 130) and may obtain CGI of each cell based on the system information of the cell (step 7). UE 110 may then send a Measurement Report message with the CGIs of the cells for which CGIs should be reported (step 8). Booster eNBs may be selected for UE 110 based on the measurement results and/or other information.

Figure 11:
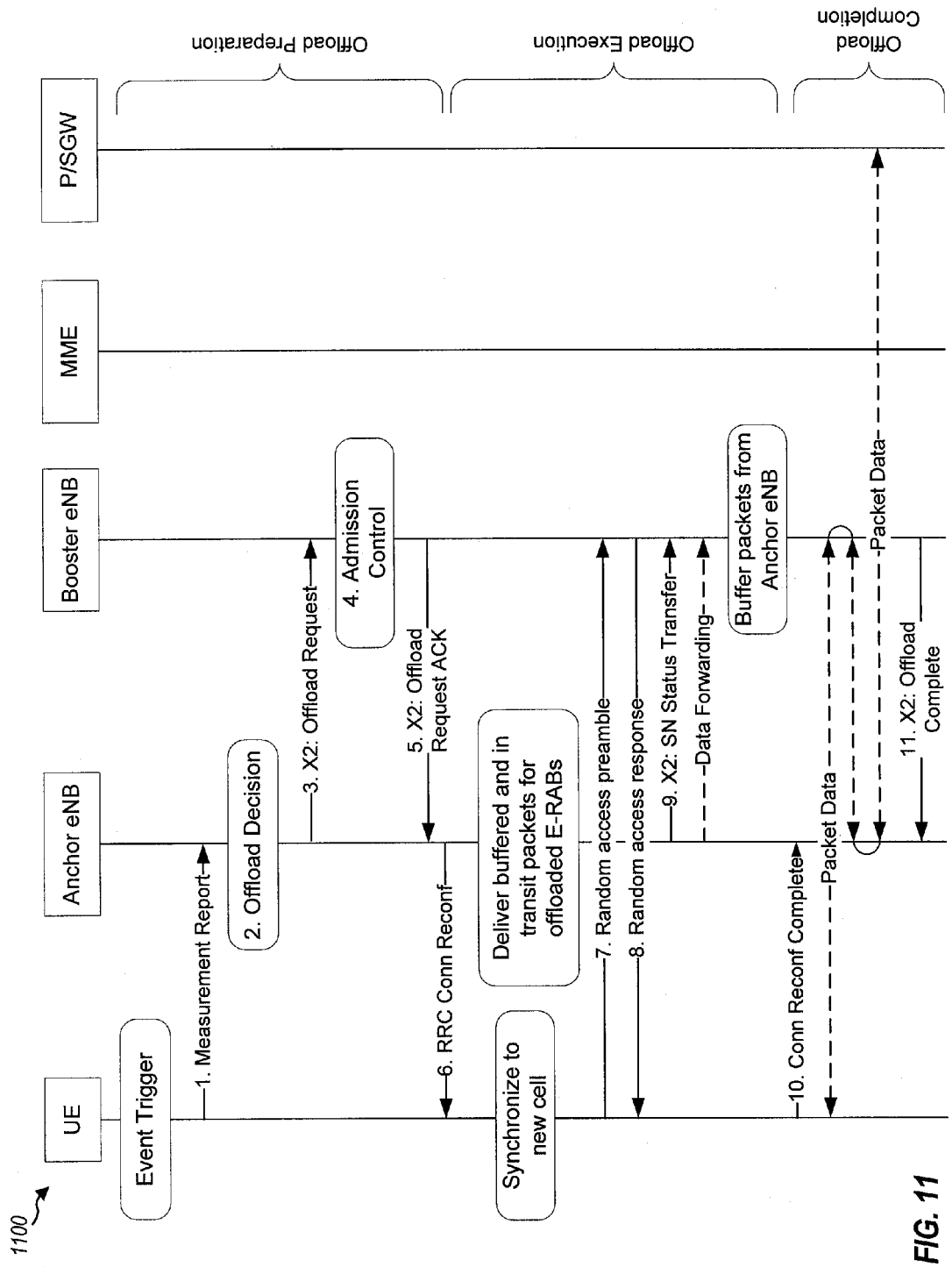
FIG. 11 is a call flow diagram illustrating a design of a call flow for offloading data bearers from an anchor eNB to a booster eNB for data bearers terminated at the RAN.

FIG. 11 shows a design of a call flow 1100 for offloading data bearers from anchor eNB 130 to booster eNB 132 for data bearers terminated at RAN 120. Call flow 1100 may be applicable for the network architecture shown in FIG. 4 or 6 and may assume that no RRC is available at booster eNB 132. Call flow 1100 includes an offload preparation phase, an offload execution phase, and an offload completion phase.

Anchor eNB 130 may provide a measurement configuration to UE 110 to make measurements of cells (not shown in FIG. 11). UE 110 may make measurements of cells when triggered by an event and may report measurement results to anchor eNB 130 (step 1). UE 110 may read the system information, such as through SIB1, of measured cells to obtain CGIs of these cells (if necessary), and the CGIs may be used to unambiguously identify these cells.

Anchor eNB 130 may determine which data bearers to offload to booster eNB 132 based on the measurement results and/or other information (step 2). For step 2, anchor eNB 130 may determine which evolved Radio Access Bearers (E-RABs) to offload to booster eNB 132. There may be a one-to-one mapping between an E-RAB and a data bearer. Anchor eNB 130 may then send an OFFLOAD REQUEST message (which may be similar to a HANDOVER REQUEST message) to booster eNB 132 (step 3). An OFFLOAD REQUEST may be any type of message to serve the data at another eNB other than the serving eNB, such as anchor eNB 130. The OFFLOAD REQUEST message may include a list of data bearers to be offloaded and pertinent information for each data bearer such as QoS information, an indication that anchor eNB 130 proposes to forward downlink data, TNL IP address information, GTP Tunnel Endpoint ID (TEID), etc. The QOS information may include a QoS Class Identifier (QCI), allocation and retention priority (ARP) which indicates a priority for access control (or which data bearers to drop first if a cell becomes congested), GBR QoS Information that may indicate a maximum bit rate and a guaranteed bit rate of a GBR bearer for downlink and uplink, etc. The TNL IP address information may include an IP address that each side may use for a GTP tunnel for a data bearer, e.g., an eNB may use a separate IP address for each type of QCI. The TEID may identify a tunnel for a data bearer on each side. Anchor eNB 130 may or may not include GTP-U addressing information of serving gateway 146 and/or PDN gateway 148 since booster eNB 132 will use the X2 interface to anchor eNB 130 and not the S1 interface to core network 140.

Booster eNB 132 may receive the OFFLOAD REQUEST message from anchor eNB 130 and may perform admission control for the list of data bearers sent by anchor eNB 130 (step 4). Booster eNB 132 may then return an acknowledgment message, such as OFFLOAD REQUEST ACK message, (which may be similar to a HANDOVER REQUEST ACK message) to anchor eNB 130 (step 5). The OFFLOAD REQUEST ACK message may include a booster eNB to anchor eNB transparent container and a list of data bearers setup. The transparent container may include a command message, such as an OffloadCommand message, which may be similar to a HandoverCommand message. The list of data bearers setup may include pertinent information for each data bearer such as (i) GTP-U addressing information for booster eNB downlink, which may be used by anchor eNB 130 to forward downlink data for the data bearers to booster eNB 132, and (ii) GTP-U addressing information for booster eNB uplink, which may be used by booster eNB 132 to forward uplink data for UE 110 to anchor eNB 130.

Anchor eNB 130 may send a connection reconfiguration message, such as RRCConnectionReconfiguration message, to UE 110 (step 6). This message may include dedicated radio resource configuration information for the list of data bearers being offloaded to booster eNB 132. UE 110 may reset MAC and may re-establish PDCP and RLC for all data bearers being offloaded to booster eNB 132. UE 110 may operate in an RRC_CONNECTED state and may send a contention-free random access preamble (RAP) on a random access channel (RACH) to booster eNB (step 7). Booster eNB 132 may receive the random access preamble from UE 110 and may validate a signature sequence in the random access preamble. Booster eNB 132 may then send a random access response to UE 110 (step 8). The random access response may be addressed to an appropriate Cell Radio Network Temporary Identity (C-RNTI) on a PDCCH assigned to UE 110 by booster eNB 132.

Anchor eNB 130 may send a status transfer message, such as SN STATUS TRANSFER message, to booster eNB 132 to convey uplink PDCP SN receiver status and downlink PDCP SN transmitter status of data bearers for which PDCP status preservation applies, e.g., data bearers with RLC acknowledged mode (AM) (step 9). Anchor eNB 130 may send this message only if at least one data bearer with RLC-AM is being offloaded to booster eNB 132. Anchor eNB 130 may begin to forward, in order, downlink data for the offloaded data bearers (which may be stored in data bearer buffers at anchor eNB 130) to booster eNB 132. Step 9 and data forwarding by anchor eNB 130 may occur at any time after step 6, e.g., in parallel and immediately following step 6.

UE 110 may send a connection reconfiguration complete message, such as RRCConnectionReconfigurationComplete message, to anchor eNB 130 (step 10). Booster eNB 132 may send control information on a PDCCH to the UE. The control information may include an uplink grant for a new transmission. The PDCCH may be addressed to a C-RNTI assigned to UE 110 by booster eNB 132 and sent in the connection reconfiguration message in step 6. UE 110 may thereafter send uplink data and receive downlink data for all offloaded data bearers via booster eNB 132. Booster eNB 132 may send a completion message, such as UE OFFLOAD COMPLETE message, (which may be similar to a UE CONTEXT RELEASE message) to anchor eNB 130 (step 11). This message may include an eNB UE X2AP ID for anchor eNB 130 and an eNB UE X2AP ID for booster eNB 132.

Figure 12:
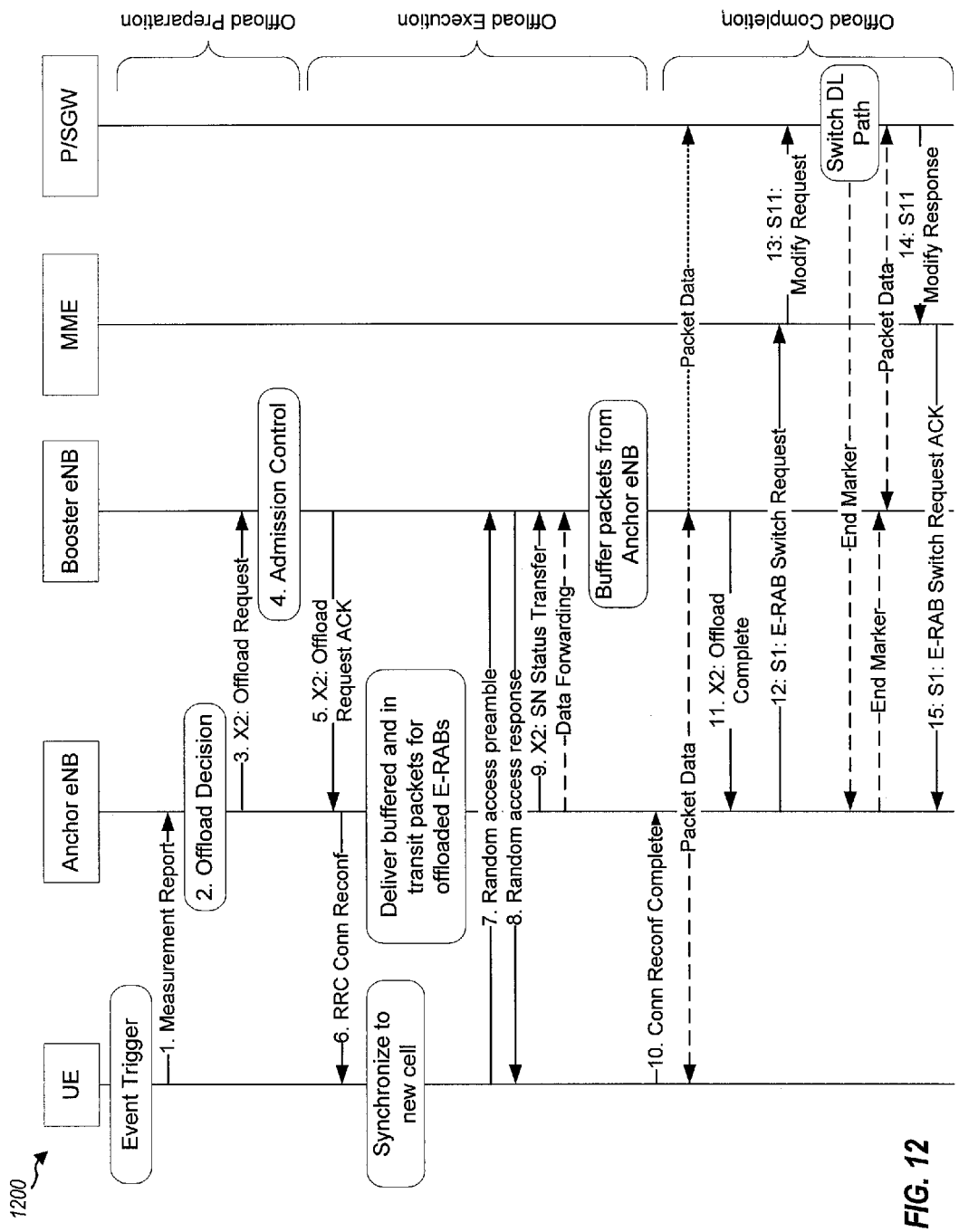
FIG. 12 is a call flow diagram illustrating a design of a call flow for offloading data bearers from an anchor eNB to a booster eNB for data bearers terminated at the core network.

FIG. 12 shows a design of a call flow 1200 for offloading data bearers from anchor eNB 130 to booster eNB 132 for data bearers terminated at core network 140. Call flow 1200 may be applicable for the network architecture shown in FIG. 2. Call flow 1200 includes steps 1 to 11 that correspond to steps 1 to 11 in call flow 1100 in FIG. 11. Call flow 1200 further includes additional steps to modify data bearers in core network 140 to route data for UE 110 to and from serving gateway 146.

After steps 7 and 8, booster eNB 132 may send a switch request message, such as E-RAB SWITCH REQUEST message, (which may be similar to a PATH SWITCH REQUEST message) to MME 142 for E-RABs corresponding to data bearers being offloaded to booster eNB 132 (step 12). The E-RAB SWITCH REQUEST message may include an MME UE S1AP ID, an eNB UE S1AP ID for booster eNB 132, a list of data bearers being offloaded, and pertinent information for each data bearer, which may include GTP-U addressing information for booster eNB downlink and uplink. Alternatively, booster eNB 132 may send an E-RAB SWITCH REQUEST message to MME 142 after step 9.

MME 142 may receive the E-RAB SWITCH REQUEST message and may send a Modify Bearer Request message to serving gateway 146/PDN gateway 148 (step 13). The Modify Bearer Request message may include the list of data bearers being offloaded, pertinent information for each data bearer, address information for booster eNB 132, etc. The pertinent information for each data bearer may include a data bearer ID for each data bearer, e.g., data bearer IDs for the default data bearer and all dedicated data bearers. The address information may include a Tunnel End Point Identifier (TEID) and an IP address of booster eNB 132 for the user plane, which may be used to uniquely identify the default data bearer and the dedicated data bearers for UE 110.

Serving gateway 146/PDN gateway 148 may receive the Modify Bearer Request message from MME 142 and may send one or more GTP-U 'End Marker' packets to anchor eNB 130. Serving gateway 146/PDN gateway 148 may also begin to send downlink data for the offloaded data bearers directly to booster eNB 132. Anchor eNB 130 may send one or more GTP-U 'End Marker' packets to booster eNB 132. Booster eNB 132 may receive downlink data for the offloaded data bearers directly from serving gateway 146/PDN gateway 148 and may begin to send the downlink data for the offloaded data bearers to UE 110.

Serving gateway 146/PDN gateway 148 may send a Modify Bearer Response message to MME 142 (step 14). MME 142 may send a switch request acknowledgement message, such as E-RAB SWITCH REQUEST ACK message, (which may be similar to a PATH SWITCH REQUEST ACK message) to booster eNB 132 (step 15).

Figure 13:
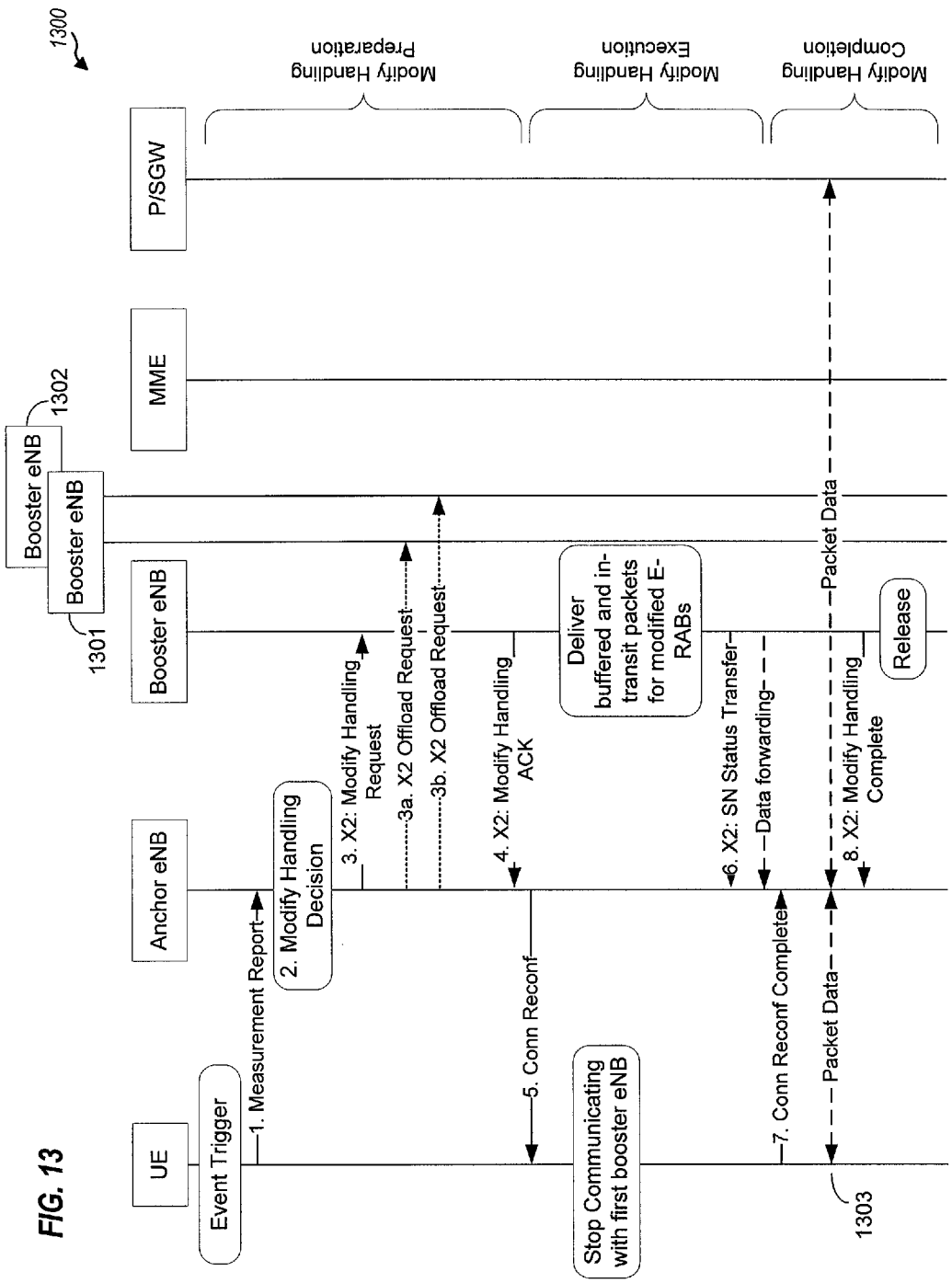
FIG. 13 is a call flow diagram illustrating a design of a call flow for taking back data bearers from a booster eNB by an anchor eNB for data bearers terminated at the RAN.

FIG. 13 shows a design of a call flow 1300 for modifying handling of the data bearers from booster eNB 132 by anchor eNB 130 for data bearers terminated at RAN 120. When the modification of the handling of the data bearers results in the data bearers returning for handling by anchor eNB 130, it may also be referred to as take back or fallback. Call flow 1300 may be applicable for the network architecture shown in FIG. 4 or 6 and may assume that no RRC is available at booster eNB 132. Call flow 1300 includes a modify handling preparation phase, a modify handling execution phase, and a modify handling completion phase.

UE 110 may send a measurement report to anchor eNB 130 in response to a trigger event, which may be determined by a measurement configuration of UE 110 (step 1). The measurement report may include measurement results for one or more cells served by booster eNB 132 and/or other cells. Anchor eNB 130 may determine to modify handling of all data bearers of UE 110 that have been offloaded to booster eNB 132 (step 2). Alternatively, anchor eNB 130 may decide to modify handling of only a subset of the data bearers that have been offloaded to booster eNB 132. Alternatively still, anchor eNB 130 may decide to direct handling of the all or a subset of the offloaded data bearers to one or more other booster eNBs. An offloading procedure (e.g., in FIG. 11 or 12) or a modify handling procedure may be used to change which data bearers to offload to booster eNB 132 while maintaining an active connection with booster eNB 132.

Anchor eNB 130 may send a handling modification request message, such as MODIFY HANDLING REQUEST message, to booster eNB 132 (step 3). In case of changing which data bearers to offload to booster eNB 132, the MODIFY HANDLING REQUEST message may include a list of data bearers that are no longer offloaded and/or a list of additional data bearers to be offloaded. The message may also include pertinent information for each additional offloaded data bearer such as QoS information, an indication that anchor eNB 130 proposes to forward downlink data for the data bearer, etc. If anchor eNB 130 does not take back the data bearers, then, in alternative aspects, anchor eNB 130 may send offload requests to one or more other booster eNBs, such as booster eNBs 1301 and 1302 (alternative steps 3a and 3b) and inform booster eNB 132 in the message that the data bearers will be forwarded to booster eNBs 1301 and 1302.

Booster eNB 132 may receive the message from anchor eNB 130 and may return an acknowledgement message, such as MODIFY HANDLING REQUEST ACK message, to anchor eNB 130 (step 4).

Anchor eNB 130 may send connection reconfiguration message, such as RRCConnectionReconfiguration message, to UE 110 (step 5). This message may include dedicated radio resource configuration information for the list of data bearers whose handling is being modified by anchor eNB 130. Alternatively, the message may indicate to release the data bearers at booster eNB 132 and to reconfigure the data bearers to be used at anchor eNB 130 or one or more of booster eNBs 1301 and 1302 or a combination thereof. In any case, UE 110 may receive the connection reconfiguration message from anchor eNB 130 and may reset MAC and re-establish PDCP and RLC for all data bearers whose handling is being modified.

Booster eNB 132 may send a transfer status message, such as SN STATUS TRANSFER message, to anchor eNB 130 to convey uplink PDCP SN receiver status and downlink PDCP SN transmitter status of E-RABs for which PDCP status preservation applies, e.g., for data bearers with RLC-AM (step 6). Booster eNB 132 sends this message only if at least one data bearer is RLC-AM was offloaded to booster eNB 132. Booster eNB 132 may begin forwarding, in order, downlink data for data bearers whose handling is being modified (which may be stored in data bearer buffers) to anchor eNB 130 or the base station who will be handling the offloaded data bearers. Alternatively, anchor eNB 130 may have buffered the downlink data for UE 110, and so the data does not need to be forwarded by booster eNB 132. Step 6 and data forwarding by booster eNB 132 may occur at any time after step 4, e.g., in parallel and immediately following step 4.

UE 110 may send a connection reconfiguration complete message, such as RRCConnectionReconfigurationComplete message, to anchor eNB 130 (step 7). If there are no remaining E-RABs for UE 110 at booster eNB 132, then UE 110 may stop communicating with booster eNB 132 and may release any related resources assigned to UE 110 by booster eNB 132.

It should be noted that in alternative aspects, such as when anchor eNB 130 decides to offload the data bearers from booster eNB 132 to booster eNBs 1301 and 1302, the packet data exchanged with UE 110 may be exchanged with booster eNBs 1301 and 1302, in addition to or instead of from anchor eNB 130.

Anchor eNB 130 may send a handling modification complete message, such as UE MODIFY HANDLING COMPLETE message, (which may be similar to a UE CONTEXT RELEASE message) to booster eNB 132 (step 8). The UE handling modification complete message may include an eNB UE X2AP ID for anchor eNB 130 or any of the other base stations now handling the offloaded bearers from booster eNB 132 and an eNB UE X2AP ID for booster eNB 132.

Figure 14:
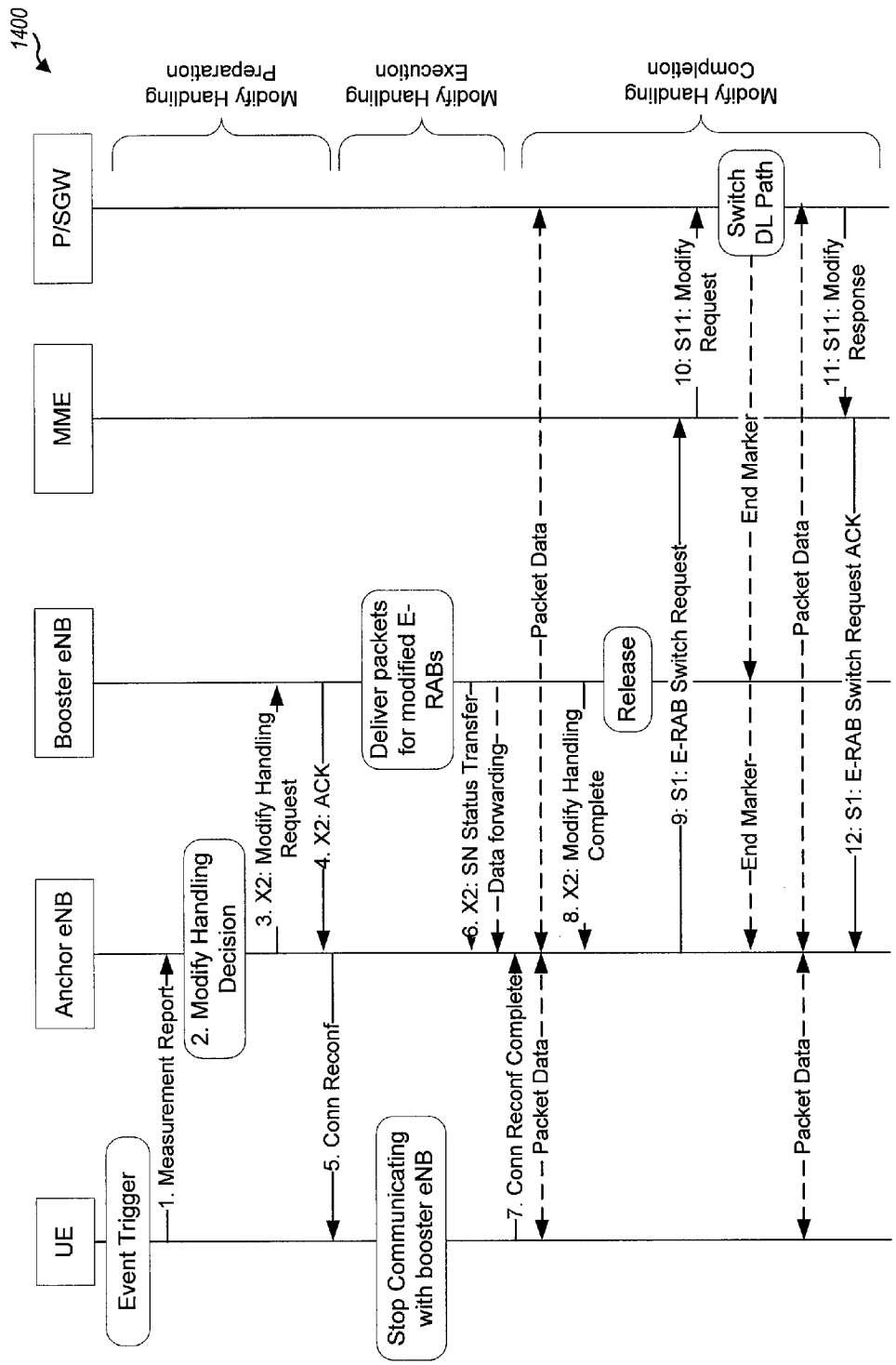
FIG. 14 is a call flow diagram illustrating a design of a call flow for taking back data bearers from a booster eNB by an anchor eNB for data bearers terminated at the core network.

FIG. 14 shows a design of a call flow 1400 for taking back data bearers from booster eNB 132 by anchor eNB 130 for data bearers terminated at core network 140. Call flow 1400 may be applicable for the network architecture shown in FIG. 2 and may assume that no RRC is available at booster eNB 132. Call flow 1400 includes steps 1 to 8 that correspond to steps 1 to 8 in call flow 1300 in FIG. 13. Call flow 1400 further includes additional steps to modify data bearers in core network 140 to route data for UE 110 to and from serving gateway 146.

Anchor eNB 130 may send an E-RAB SWITCH REQUEST message to MME 142 for data bearers to be offloaded (which may exclude data bearers whose handling is being modified). This message may include an MME UE S1AP ID for MME 142, an eNB UE S1AP ID for booster eNB 132, a list of data bearers to be offloaded, and pertinent information for each data bearer such as eNB GTP-U addressing information (step 9). Step 9 may occur any time after (e.g., immediately following) steps 6 and 7.

MME 142 may send a Modify Bearer Request message to serving gateway 146/PDN gateway 148. This message may include the list of data bearers to be offloaded and pertinent information for each data bearer such as a data bearer ID (e.g., data bearer IDs for the default data bearer and all dedicated data bearers), TEID and IPv4 address of anchor eNB 130 for the user plane (which may be used to uniquely identify the default data bearer and the dedicated data bearers of UE 110), and/or other information.

Serving gateway 146/PDN gateway 148 may receive the Modify Bearer Request message from MME 142 and may send one or more GTP-U 'End Marker' packets to booster eNB 132. Serving gateway 146/PDN gateway 148 may also begin to send downlink data (e.g., directly) to anchor eNB 130 for data bearers whose handling is being modified. Booster eNB 132 may forward one or more GTP-U 'End Marker' packets to anchor eNB 130. Anchor eNB 130 may thereafter receive downlink data for the offloaded data bearers of UE 110 from serving gateway 146/PDN gateway 148 and may send the data to UE 110.

Serving gateway 146/PDN gateway 148 may send a Modify Bearer Response message to MME 142 (step 11). MME 142 may send an E-RAB SWITCH REQUEST ACK message to anchor eNB 130 (step 12).

Figure 15:
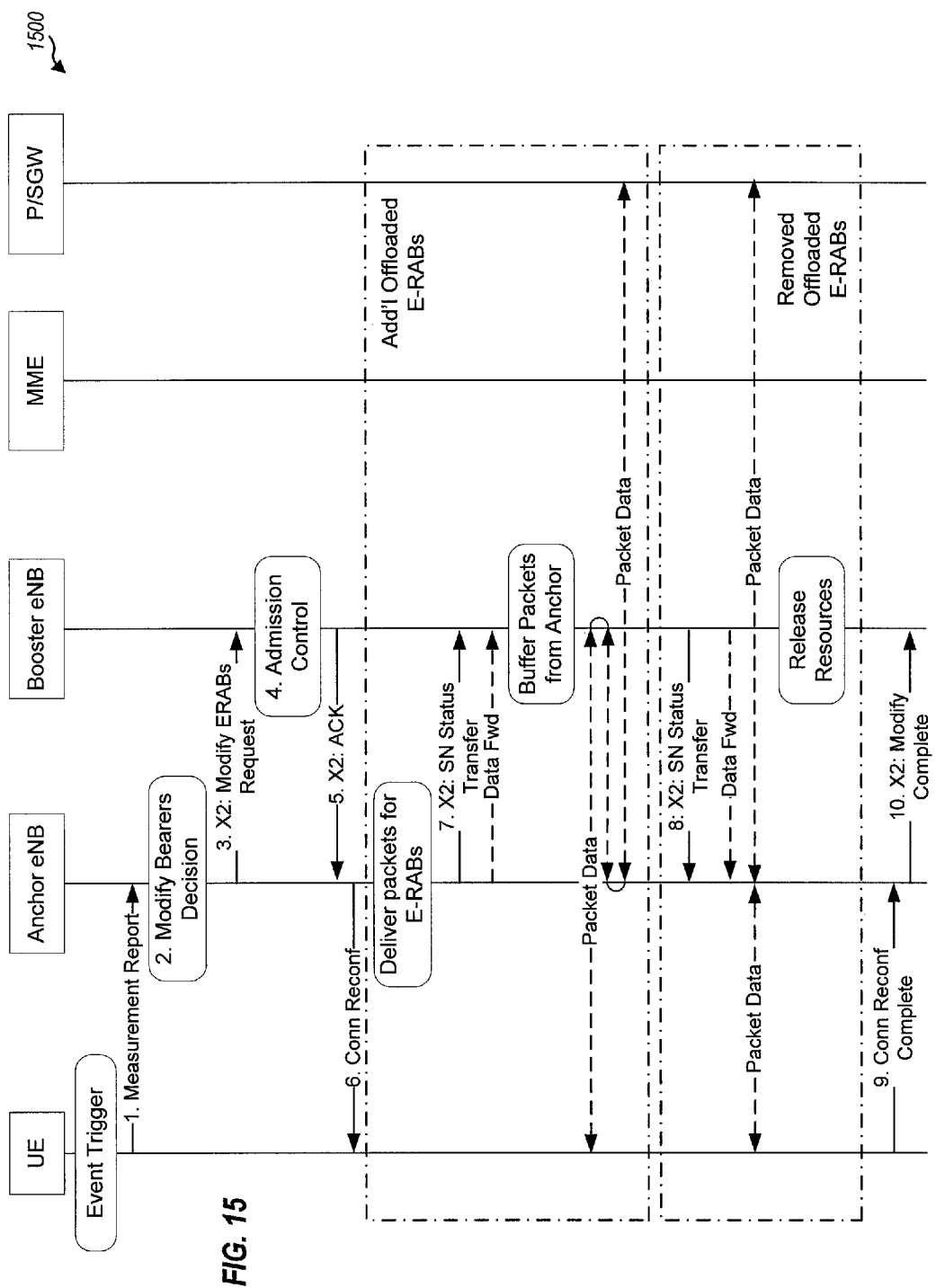
FIG. 15 is a call flow diagram illustrating a design of a call flow for adding or removing data bearers at a booster eNB for data bearers terminated at the RAN.

FIG. 15 shows a design of a call flow 1500 for adding or removing data bearers at booster eNB 132 for data bearers terminated at RAN 120. Call flow 1500 may be applicable for the network architecture shown in FIG. 4 or 6 and may assume that no RRC is available at booster eNB 132.

UE 110 may send a measurement report to anchor eNB 130 in response to a trigger event, which may be determined by a measurement configuration of UE 110 (step 1). The measurement report may include measurement results for one or more cells served by booster eNB 132 and/or other cells. Anchor eNB 130 may determine a list of E-RABs to be added and/or a list of E-RABs to be removed at booster eNB 132 (step 2). Each E-RAB may be associated with a data bearer of UE 110 to be added or removed at booster eNB 132.

Anchor eNB 130 may send a MODIFY E-RABs REQUEST message (which may be similar to a HANDOVER REQUEST message) to booster eNB 132 (step 3). The MODIFY E-RABs REQUEST message may include a list of data bearers to be added to the data bearers (if any) already served by booster eNB 132 (i.e., a list of data bearers to offload) and/or a list of data bearers to no longer be served by booster eNB 132 and/or (a list of data bearers whose handling should being modified). The message may also include pertinent information for each data bearer to be added such as QoS information, an indication that anchor eNB 130 proposes to forward downlink data for UE 110, etc. Anchor eNB 130 may or may not include GTP-U addressing information for serving gateway 146 and PDN gateway 148 since booster eNB 132 may use the X2 interface to anchor eNB 130 and not the S1 interface.

Booster eNB 132 may perform admission control for the list of data bearers to be added as sent by anchor eNB 130 (step 4). Booster eNB 132 may send a MODIFY E-RABs REQUEST ACK message (which may be similar to a HANDOVER REQUEST message) to anchor eNB 130 (step 5). The MODIFY E-RABs REQUEST ACK message may include a booster eNB to anchor eNB transparent container, a list of data bearers to be added to booster eNB 132, and pertinent information for each data bearer. The transparent container may include a ModifyCommand message (which may be similar to a HandoverCommand message). The pertinent information for each data bearer may include (i) booster eNB DL GTP-U addressing information, which may be used by anchor eNB 130 to forward downlink data for the added offloaded data bearers to booster eNB 132, and (ii) booster eNB UL GTP-U addressing information, which may be used by booster eNB 132 to forward uplink data for the added offloaded data bearers to anchor eNB 130.

Anchor eNB 130 may send an RRCConnectionReconfiguration message to UE 110 (step 6). This message may include dedicated radio resource configuration information for the data bearers to be added at booster eNB 132 and the data bearers to be removed from booster eNB 132 and served at anchor eNB 130. UE 110 may reset MAC and re-establish PDCP and RLC for all data bearers to be added or removed at the booster eNB 132.

Anchor eNB 130 may send an SN STATUS TRANSFER message to booster eNB 132 to convey uplink PDCP SN receiver status and downlink PDCP SN transmitter status of the added E-RABs for which PDCP status preservation applies, e.g., data bearers with RLC-AM (step 7). Anchor eNB 130 may send this message only if at least one data bearer with RLC-AM is added to the list of data bearers offloaded booster eNB 132. Anchor eNB 130 may begin to forward, in order, downlink data for the added offloaded data bearers (which may be stored in data bearer buffers) to booster eNB 132.

Booster eNB 132 may send an SN STATUS TRANSFER message to anchor eNB 130 to convey uplink PDCP SN receiver status and downlink PDCP SN transmitter status of E-RABs for which PDCP status preservation applies (step 8). Booster eNB 132 may send this message only if at least one data bearer with RLC-AM was removed. Booster eNB 132 may begin to forward, in order, downlink data for UE 110 for the removed data bearers (which may be stored in data bearer buffers) to anchor eNB 132. Step 8 and the data forwarding may occur any time (e.g., in parallel and immediately) after step 5. Alternatively, anchor eNB 130 may have buffered the downlink data for UE 110, and booster eNB 132 may not need to forward the downlink data for UE 110.

UE 110 may send an RRCConnectionReconfiguration-Complete message to anchor eNB 130 (step 9). Anchor eNB 130 may send a MODIFY E-RABs COMPLETE message to booster eNB 132 (step 10).

Figure 16:
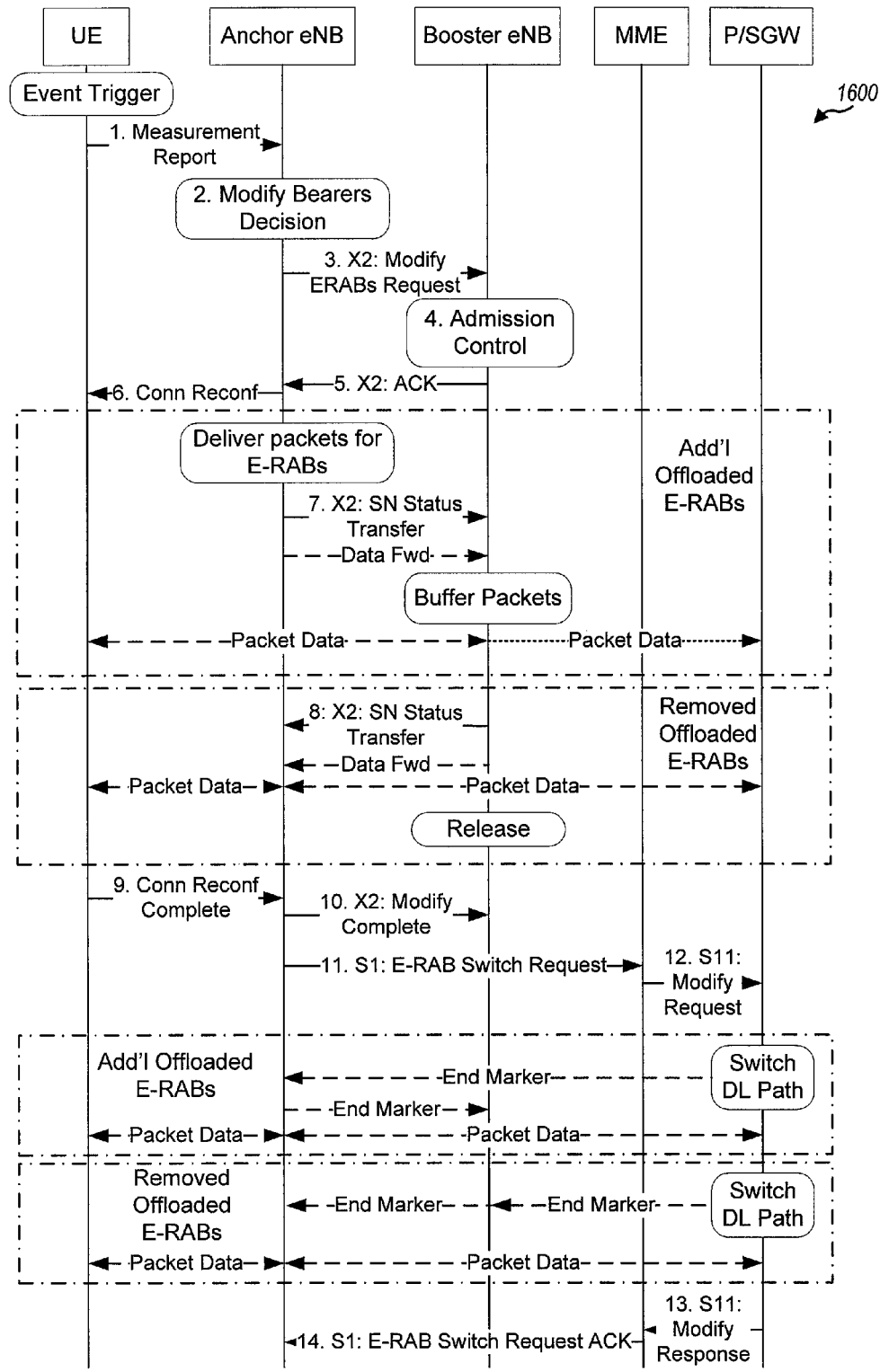
FIG. 16 is a call flow diagram illustrating a design of a call flow for adding or removing data bearers at a booster eNB for data bearers terminated at the core network.

FIG. 16 shows a design of a call flow 1600 for adding or removing data bearers at booster eNB 132 for data bearers terminated at core network 140. Call flow 1600 may be applicable for the network architecture shown in FIG. 2 and may assume that no RRC is available at booster eNB 132. Call flow 1600 includes steps 1 to 10 that correspond to steps 1 to 10 in call flow 1500 in FIG. 15. Call flow 1600 further includes additional steps to modify data bearers in core network 140 to route data for UE 110 to and from serving gateway 146.

Anchor eNB 130 may send an E-RAB SWITCH REQUEST message to MME 142 for data bearers to be added or removed at booster eNB 132 (step 11). This message may include an MME UE S1AP ID for MME 142, an eNB UE S1AP ID for booster eNB 132, a list of data bearers to be modified, and pertinent information for each data bearer such as eNB GTP-U addressing information.

MME 142 may send a Modify Bearer Request message to serving gateway 146/PDN gateway 148 (step 12). This message may include the list of data bearers to be modified and pertinent information for each data bearer such as data bearer ID (e.g., data bearer IDs for the default data bearer and all dedicated data bearers). This message may also include, for added data bearers, the TEID and IPv4 address of booster eNB 132 for the user plane. This message may also include, for removed data bearers, the TEID and IPv4 address of anchor eNB 130 for the user plane.

Upon receiving the Modify Bearer Request message from MME 142, serving gateway 146/PDN gateway 148 may send one or more GTP-U 'End Marker' packets to anchor eNB 130 for added offloaded data bearers and to booster eNB 132 for removed offloaded data bearers. Serving gateway 146/PDN gateway 148 may begin to send (i) downlink data for the added offloaded data bearers directly to booster eNB 132 and (ii) downlink data for the removed data bearers directly to anchor eNB 130. For the added offloaded data bearers, anchor eNB 130 may forward one or more GTP-U 'End Marker' packets to booster eNB 132. Booster eNB 132 may thereafter receive downlink data for the added offloaded data bearers from serving gateway 146/PDN gateway 148 and may send the downlink data to UE 110. For the removed offloaded data bearers, booster eNB 132 may forward one or more GTP-U 'End Marker' packets to anchor eNB 130. Anchor eNB may thereafter receive downlink data for the removed offloaded data bearers from serving gateway 146/PDN gateway 148 and may send the downlink data to UE 110.

Serving gateway 146/PDN gateway 148 may send a Modify Bearer Response message to MME 142 (step 13). MME 142 may send an E-RAB SWITCH REQUEST ACK message to anchor eNB 130 (step 14).

FIG. 17 shows a design of a process 1700 for supporting communication in a wireless network. Process 1700 may be performed by a first base station/eNB (as described below) or by some other entity. The first base station may identify a plurality of data bearers configured for a UE served by the first base station (block 1712). The first base station may be an anchor eNB for the UE. In one design, the plurality of data bearers may carry data sent via a plurality of carriers configured for the UE for carrier aggregation. The first base station may receive from the UE a measurement report identifying a second base station (block 1714). The first base station may determine to offload at least one data bearer, from among the plurality of data bearers, to the second base station (block 1716). The first base station may communicate with the second base station to offload the at least one data bearer to the second base station (block 1718). Data for the UE may be sent via the plurality of data bearers through the first base station and the second base station.

In one design of block 1718, the first base station may send an offload request message to the second base station (e.g., in step 3 in FIG. 11 or 12). The offload request message may convey the at least one data bearer being offloaded to the second base station. The offload request message may also include QoS information and/or other information for the at least one data bearer. The first base station may forward data for the at least one data bearer to the second base station.

The first base station may send a reconfiguration message to the UE (e.g., in step 6 in FIG. 11 or 12). The reconfiguration message may include radio resource configuration information for at least one radio access bearer associated with the at least one data bearer being offloaded to the second base station. A switch request message may be sent from the second base station to a MME (e.g., in step 12 in FIG. 12) to convey the at least one data bearer being offloaded to the second base station.

The first base station may determine to modify handling of one or more data bearers from the second base station (block 1720). The one or more data bearers may be among the at least one data bearer offloaded to the second base station. In general, all or a subset of the offloaded data bearers may have their handling modified. The first base station may communicate with the second base station to modify handling of the one or more data bearers from the second base station, (block 1722). Data for the one or more data bearers of the UE may thereafter be sent via the first base station.

In one design of block 1722, the first base station may send a modify handling request message to the second base station (e.g., in step 3 in FIG. 13 or 14). The modify handling request message may convey the one or more data bearer whose handling is being modified from the second base station. The first base station may receive data for the one or more data bearers forwarded from the second base station to the first base station.

The first base station may send a reconfiguration message to the UE (e.g., in step 5 in FIG. 13 or 14). The reconfiguration message may include radio resource configuration information for one or more radio access bearers associated with the one or more data bearers whose handling is being modified from the second base station. The first base station may send a switch request message to the MME (e.g., in step 9 in FIG. 14). The switch request message may convey the one or more data bearers whose handling is being modified from the second base station.

The first base station may determine to modify (e.g., to offload or to modify handling) one or more data bearers of the UE (e.g., in step 3 in FIG. 15 or 16). The first base station may then communicate with the second base station to modify the one or more data bearers of the UE.

In one design, the plurality of data bearers of the UE may be terminated at a core network serving the first and second base stations, e.g., as shown in FIG. 2. In another design, the plurality of data bearers of the UE may be terminated at a RAN including the first and second base stations, e.g., as shown in FIGS. 4 and 6. The procedure for offloading data bearers and the procedure for taking back data bearers may be performed in different manners depending on whether the data bearers are terminated at the core network or the RAN, e.g., as shown in FIGS. 11 to 16.

In one design, the first base station may receive a measurement report from the UE and may identify the second base station to offload the at least one data bearer in block 1716 based on the measurement report. In one design, the first base station may obtain a PCI for the second base station from the measurement report and may identify the second base station based on the PCI. In another design, the first base station may obtain a CGI for the second base station from the measurement report and may identify the second base station based on the CGI.

FIG. 18 shows a design of a process 1800 for supporting communication in a wireless network. Process 1800 may be performed by a second base station/eNB (as described below) or by some other entity. The second base station may receive an offload request message sent by a first base station (e.g., in step 3 in FIG. 11 or 12) (block 1812). The offload request message may convey at least one data bearer to offload to the second base station. The at least one data bearer may be among a plurality of data bearers configured for a UE, e.g., for carrier aggregation. The first base station may be an anchor eNB for the UE, and the second base station may be a booster eNB for the UE. The second base station may admit the at least one data bearer of the UE (e.g., in step 4 in FIG. 11 or 12) (block 1814). The second base station may receive downlink data for the at least one data bearer from the first base station. The second base station may thereafter exchange (e.g., send and/or receive) data for the at least one data bearer of the UE (block 1816).

The second base station may receive a modify handling request message from (e.g., in step 3 in FIG. 13 or 14) (block 1818). The modify handling request message may convey one or more data bearers whose handling is being modified by the first base station from the second base station. The one or more data bearers may be among the at least one data bearer offloaded to the second base station. The second base station may forward downlink data for the one or more data bearers to the first base station and may stop exchanging data for the one or more data bearers (block 1820).

The second base station may receive a modify request message from the first base station (e.g., in step 3 in FIG. 15 or 16). The modify request message may convey one or more data bearers being offloaded to or whose handling is being modified from the second base station. The second base station may (i) receive downlink data for the one or more data bearers if they are being offloaded to the second base station or (ii) forward downlink data for the one or more data bearers if they are whose handling is being modified by the first base station.

Figure 19:
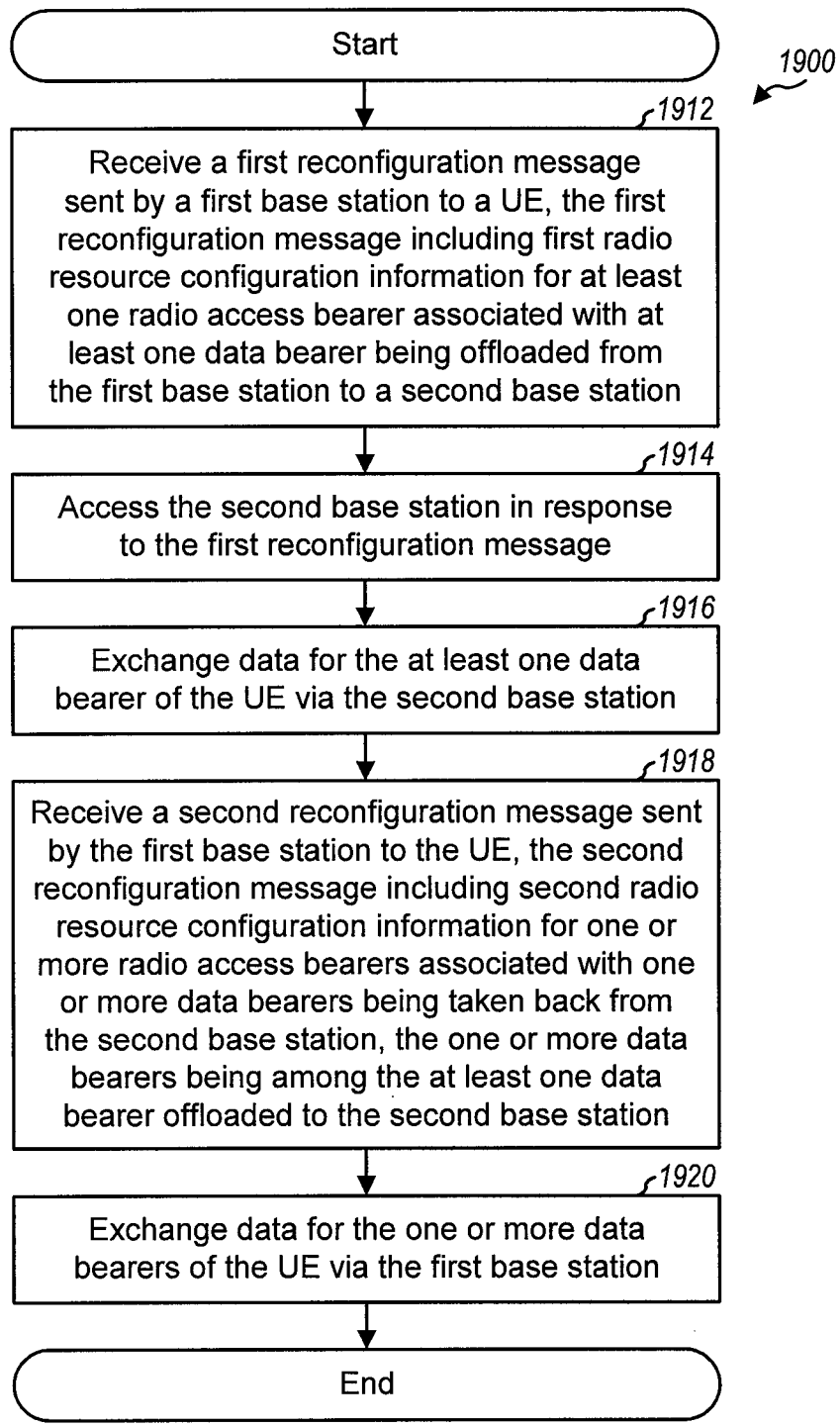

FIG. 19 shows a design of a process 1900 for communicating in a wireless network. Process 1900 may be performed by a UE (as described below) or by some other entity. The UE may receive a first reconfiguration message from a first base station (e.g., in step 6 in FIG. 11 or 12) (block 1912). The first reconfiguration message may include first radio resource configuration information for at least one radio access bearer associated with at least one data bearer being offloaded from the first base station to a second base station. In one design, the at least one data bearer may be among a plurality of data bearers configured for the UE for carrier aggregation. The first base station may be an anchor eNB for the UE, and the second base station may be a booster eNB for the UE. The UE may access the second base station (e.g., via a RACH) in response to the first reconfiguration message (e.g., in step 7 in FIG. 11 or 12) (block 1914). The UE may thereafter exchange (e.g., send and/or receive) data for the at least one data bearer of the UE via the second base station (block 1916).

The UE may receive a second reconfiguration message from the first base station (in step 5 in FIG. 14 or 15) (block 1918). The second reconfiguration message may include second radio resource configuration information for one or more radio access bearers associated with one or more data bearers whose handling is being modified from the second base station. The one or more data bearers may be among the at least one data bearer offloaded to the second base station. The UE may stop communicating with the second base station for the one or more data bearers and may exchange data for the one or more data bearers of the UE via the first base station (block 1920).

The UE may receive a third reconfiguration message from the first base station (in step 6 in FIG. 15 or 16). The third reconfiguration message may include third radio resource configuration information for one or more radio access bearers associated with one or more data bearers of the UE being offloaded to the second base station or whose handling is being modified from the second base station. The UE may (i) start communicating with the second base station for the one or more data bearers if they are being offloaded or (ii) stop communicating with the second base station for the one or more data bearers if they are whose handling is being modified.

Figure 20:
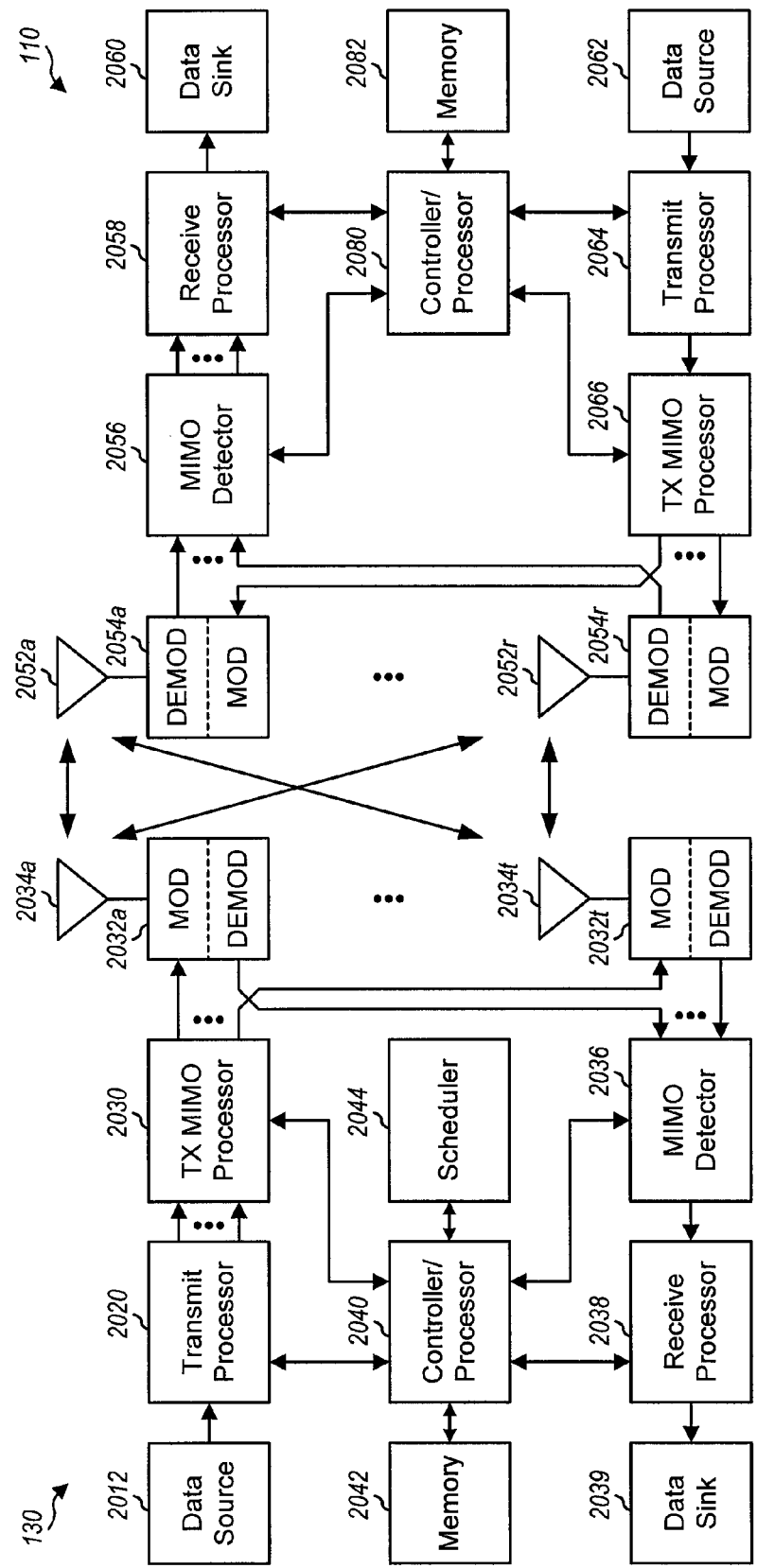
FIG. 20 is a block diagram illustrating an exemplary design of a UE and an eNB/base station as depicted in FIG. 1.

FIG. 20 shows a block diagram of an exemplary design of UE 110 and eNB/base station 130 in FIG. 1. eNB 130 may be equipped with T antennas 2034*a* through 2034*t*, and UE 110 may be equipped with R antennas 2052*a* through 2052*r*, where in general $T \geq 1$ and $R \geq 1$.

At eNB 130, a transmit processor 2020 may receive data for one or more UEs from a data source 2012 and control information from a controller/processor 2040. Data source 2012 may implement data buffers for all data bearers configured for UE 110 and other UEs served by eNB 130. Transmit processor 2020 may process (e.g., encode, interleave, and symbol map) the data and control information to obtain data symbols and control symbols, respectively. Transmit processor 2020 may also generate reference symbols for one or more reference signals. A transmit (TX) multiple-input multiple-output (MIMO) processor 2030 may perform spatial processing (e.g., precoding) on the data symbols, the control symbols, and/or the reference symbols, if applicable, and may provide T output symbol streams to T modulators (MODs) 2032a through 2032t. Each modulator 2032 may process a respective output symbol stream (e.g., for OFDM, SC-FDMA, CDMA, etc.) to obtain an output sample stream. Each modulator 2032 may further process (e.g., convert to analog, amplify, filter, and upconvert) the output sample stream to obtain an uplink signal. T uplink signals from modulators 2032a through 2032t may be transmitted via T antennas 2034a through 2034t, respectively.

At UE 110, antennas 2052a through 2052r may receive the downlink signals from eNB 130 and other eNBs and may provide received signals to demodulators (DEMODs) 2054a through 2054r, respectively. Each demodulator 2054 may condition (e.g., filter, amplify, downconvert, and digitize) a respective received signal to obtain received samples. Each demodulator 2054 may further process the received samples to obtain received symbols. A MIMO detector 2056 may obtain received symbols from all R demodulators 2054a through 2054r and may perform MIMO detection on the received symbols to obtain detected symbols. A receive processor 2058 may process (e.g., symbol demap, deinterleave, and decode) the detected symbols, provide decoded data to a data sink 2060, and provide decoded control information to a controller/processor 2080.

On the uplink, at UE 110, data from a data source 2062 and control information from controller/processor 2080 may be processed by a transmit processor 2064, precoded by a TX MIMO processor 2066 if applicable, conditioned by modulators 2054a through 2054r, and transmitted to eNB 130 and other eNBs. At eNB 130, the uplink signals from UE 110 and other UEs may be received by antennas 2034, conditioned by demodulators 2032, processed by a MIMO detector 2036, and further processed by a receive processor 2038 to obtain the data and control information sent by UE 110 and other UEs. Processor 2038 may provide the decoded data to a data sink 2039 and the decoded control information to controller/processor 2040.

Controllers/processors 2040 and 2080 may direct the operation at eNB 130 and UE 110, respectively. Memories 2042 and 2082 may store data and program codes for eNB 130 and UE 110, respectively. A scheduler 2044 may schedule UE 110 and other UEs for data transmission on the downlink and uplink and may assign resources to the scheduled UEs. Processor 2040 and/or other processors and modules at eNB 130 may perform or direct the operation performed by eNB 130 in call flow 900 in FIG. 9, call flow 1000 in FIG. 10, call flow 1100 in FIG. 11, call flow 1200 in FIG. 12, call flow 1300 in FIG. 13, call flow 1400 in FIG. 14, call flow 1500 in FIG. 15, call flow 1600 in FIG. 16, process 1700 in FIG. 17, process 1800 in FIG. 18, and/or other call flows and processes for the techniques described herein. Processor 2080 and/or other processors and modules at UE 110 may perform or direct the operation of UE 110 in call flows 900, 1000, 1100, 1200, 1300, 1400, 1500 and 1600, process 1900 in FIG. 19, and/or other call flows and processes for the techniques described herein data transmission on the downlink.

eNB 132 may be implemented in similar manner as eNB 130. One or more processors and/or modules at eNB 132 may perform or direct the operation performed by eNB 132 in call flows 900, 1000, 1100, 1200, 1300, 1400, 1500 and 1600, processes 1700 and 1800, and/or other processes for the techniques described herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying a plurality of data bearers configured for a user equipment (UE) served by a first base station;
   receiving from the UE a measurement report identifying a second base station;
   determining to offload at least one data bearer, among the plurality of data bearers, to the second base station;
   communicating with the second base station by the first base station to offload the at least one data bearer to the second base station, wherein data for the UE is sent via the plurality of data bearers through the first base station and the second base station;
   forwarding data for the at least one data bearer from the first base station to the second base station;
   determining, by the first base station, to modify handling of the at least one data bearer at the second base station; and
   communicating with the second base station, by the first base station, to modify handling of the at least one data bearer.

2. The method of claim 1, wherein the communicating with the second base station by the first base station to offload the at least one data bearer comprises:
   sending an offload request message from the first base station to the second base station, the offload request message conveying the at least one data bearer being offloaded to the second base station.

3. The method of claim 2, wherein the offload request message further includes quality-of-service (QoS) information for the at least one data bearer.

4. The method of claim 1, further comprising:
   sending a reconfiguration message from the first base station to the UE, the reconfiguration message including radio resource configuration information for at least one radio access bearer associated with the at least one data bearer being offloaded to the second base station.

5. The method of claim 1, wherein the determining to modify handling of the at least one data bearer at the second base station comprises:
   receiving a second measurement report from the UE at the first base station; and
   determining to modify handling of the at least one data bearer at the second base station based on the second measurement report.

6. The method of claim 1, wherein the communicating with the second base station by the first base station to modify handling of the at least one data bearer comprises:
   sending a modification request message, from the first base station to the second base station, to modify the at least one data bearer at the second base station.

7. The method of claim 1, further comprising:
   sending a reconfiguration message from the first base station to the UE, the reconfiguration message including radio resource configuration information for one or more radio access bearers associated with the at least one data bearer whose handling is being modified at the second base station.

8. A method of wireless communication, comprising:
   identifying a plurality of data bearers configured for a user equipment (UE) served by a first base station;
   receiving from the UE a measurement report identifying a second base station;
   determining to offload at least one data bearer, among the plurality of data bearers, to the second base station;
   communicating with the second base station by the first base station to offload the at least one data bearer to the second base station;
   communicating with a Mobility Management Entity (MME) to convey the at least one data bearer being offloaded to the second base station, wherein data for the UE is sent via the plurality of data bearers through the first base station and the second base station;
   determining, by the first base station, to modify handling of the at least one data bearer at the second base station; and
   communicating with the second base station, by the first base station, to modify handling of the at least one data bearer.

9. The method of claim 8, further comprising:
   sending a reconfiguration message from the first base station to the UE, the reconfiguration message including radio resource configuration information for at least one radio access bearer associated with the at least one data bearer being offloaded to the second base station.

10. The method of claim 8, wherein the determining to modify handling of the at least one data bearer at the second base station comprises:
    receiving a second measurement report from the UE at the first base station; and
    determining to modify handling of the at least one data bearer at the second base station based on the second measurement report.

11. The method of claim 8, wherein the communicating with the second base station by the first base station to modify handling of the at least one data bearer comprises:
    sending a modification request message, from the first base station to the second base station, to modify the at least one data bearer at the second base station.

12. The method of claim 8, further comprising:
sending a reconfiguration message from the first base station to the UE, the reconfiguration message including radio resource configuration information for one or more radio access bearers associated with the at least one data bearer whose handling is being modified at the second base station.

13. A method of wireless communication, comprising:
receiving an offload request message sent from a first base station to a second base station, the offload request message conveying at least one data bearer to offload to the second base station, the at least one data bearer being among a plurality of data bearers configured for a user equipment (UE);
admitting the at least one data bearer of the UE at the second base station;
receiving, at the second base station, data for the at least one data bearer from the first base station;
exchanging the data for the at least one data bearer of the UE via the second base station;
receiving a modification request message, sent from the first base station to the second base station, to modify handling of the at least one data bearer at the second base station; and
terminating exchange of data for the at least one data bearer with the UE.

14. An apparatus configured for wireless communication, comprising:
means for identifying a plurality of data bearers configured for a user equipment (UE) served by a first base station;
means for receiving from the UE a measurement report identifying a second base station;
means for determining to offload at least one data bearer, among the plurality of data bearers, to the second base station;
means for communicating with the second base station by the first base station to offload the at least one data bearer to the second base station, wherein data for the UE is sent via the plurality of data bearers through the first base station and the second base station;
means for forwarding data for the at least one data bearer from the first base station to the second base station;
means for determining, by the first base station, to modify handling of the at least one data bearer at the second base station; and
means for communicating with the second base station, by the first base station, to modify handling of the at least one data bearer.

15. The apparatus of claim 14, wherein the means for communicating with the second base station by the first base station to offload the at least one data bearer comprises:
means for sending an offload request message from the first base station to the second base station, the offload request message conveying the at least one data bearer being offloaded to the second base station.

16. The apparatus of claim 15, wherein the offload request message further includes quality-of-service (QoS) information for the at least one data bearer.

17. The apparatus of claim 14, further comprising:
means for sending a reconfiguration message from the first base station to the UE, the reconfiguration message including radio resource configuration information for at least one radio access bearer associated with the at least one data bearer being offloaded to the second base station.

18. The apparatus of claim 14, wherein the means for determining to modify handling of the at least one data bearer at the second base station comprises:
means for receiving a second measurement report from the UE at the first base station; and
means for determining to modify handling of the at least one data bearer at the second base station based on the second measurement report.

19. The apparatus of claim 14, wherein the means for communicating with the second base station by the first base station to modify handling of the at least one data bearer comprises:
means for sending a modification request message, from the first base station to the second base station, to modify the at least one data bearer at the second base station.

20. The apparatus of claim 14, further comprising:
means for sending a reconfiguration message from the first base station to the UE, the reconfiguration message including radio resource configuration information for one or more radio access bearers associated with the at least one data bearer whose handling is being modified at the second base station.

21. An apparatus configured for wireless communication, comprising:
means for identifying a plurality of data bearers configured for a user equipment (UE) served by a first base station;
means for receiving from the UE a measurement report identifying a second base station;
means for determining to offload at least one data bearer, among the plurality of data bearers, to the second base station;
means for communicating with the second base station by the first base station to offload the at least one data bearer to the second base station;
means for communicating with a Mobility Management Entity (MME) to convey the at least one data bearer being offloaded to the second base station, wherein data for the UE is sent via the plurality of data bearers through the first base station and the second base station;
means for determining, by the first base station, to modify handling of the at least one data bearer at the second base station; and
means for communicating with the second base station, by the first base station, to modify handling of the at least one data bearer.

22. The apparatus of claim 21, further comprising:
means for sending a reconfiguration message from the first base station to the UE, the reconfiguration message including radio resource configuration information for at least one radio access bearer associated with the at least one data bearer being offloaded to the second base station.

23. The apparatus of claim 21, wherein the means for determining to modify handling of the at least one data bearer at the second base station comprises:
means for receiving a second measurement report from the UE at the first base station; and
means for determining to modify handling of the at least one data bearer at the second base station based on the second measurement report.

24. The apparatus of claim 21, wherein the means for communicating with the second base station by the first base station to modify handling of the at least one data bearer comprises:
means for sending a modification request message, from the first base station to the second base station, to modify the at least one data bearers at the second base station.

25. The apparatus of claim 21, further comprising:
means for sending a reconfiguration message from the first base station to the UE, the reconfiguration message including radio resource configuration information for one or more radio access bearers associated with the at least one data bearer whose handling is being modified at the second base station.

26. An apparatus configured for wireless communication, comprising:
means for receiving an offload request message sent from a first base station to a second base station, the offload request message conveying at least one data bearer to offload to the second base station, the at least one data bearer being among a plurality of data bearers configured for a user equipment (UE);
means for admitting the at least one data bearer of the UE at the second base station;
means for receiving, at the second base station, data for the at least one data bearer from the first base station;
means for exchanging the data for the at least one data bearer of the UE via the second base station;
means for receiving a modification request message, sent from the first base station to the second base station, to modify handling of the at least one data bearer at the second base station; and
means for terminating exchange of data for the at least one data bearer with the UE.

27. A non-transitory computer-readable medium having program code recorded thereon, the program code including:
program code for causing a computer to identify a plurality of data bearers configured for a user equipment (UE) served by a first base station;
program code for causing the computer to receive from the UE a measurement report identifying a second base station;
program code for causing the computer to determine to offload at least one data bearer, among the plurality of data bearers, to the second base station;
program code for causing the computer to communicate with the second base station by the first base station to offload the at least one data bearer to the second base station, wherein data for the UE is sent via the plurality of data bearers through the first base station and the second base station;
program code for causing the computer to forward data for the at least one data bearer from the first base station to the second base station;
program code for causing the computer to determine, by the first base station, to modify handling of the at least one data bearer at the second base station; and
program code for causing the computer to communicate with the second base station, by the first base station, to modify handling of the at least one data bearer.

28. A non-transitory computer-readable medium having program code recorded thereon, the program code including:
program code for causing a computer to identify a plurality of data bearers configured for a user equipment (UE) served by a first base station;
program code for causing the computer to receive from the UE a measurement report identifying a second base station;
program code for causing the computer to determine to offload at least one data bearer, among the plurality of data bearers, to the second base station;
program code for causing the computer to communicate with the second base station by the first base station to offload the at least one data bearer to the second base station;
program code for causing the computer to communicate with a Mobility Management Entity (MME) to convey the at least one data bearer being offloaded to the second base station, wherein data for the UE is sent via the plurality of data bearers through the first base station and the second base station;
program code for causing the computer to determine, by the first base station, to modify handling of the at least one data bearer at the second base station; and
program code for causing the computer to communicate with the second base station, by the first base station, to modify handling of the at least one data bearer.

29. A non-transitory computer-readable medium having program code recorded thereon, the program code including:
program code for causing a computer to receive an offload request message sent from a first base station to a second base station, the offload request message conveying at least one data bearer to offload to the second base station, the at least one data bearer being among a plurality of data bearers configured for a user equipment (UE);
program code for causing the computer to admit the at least one data bearer of the UE at the second base station;
program code for causing the computer to receive, at the second base station, data for the at least one data bearer from the first base station;
program code for causing the computer to exchange the data for the at least one data bearer of the UE via the second base station;
program code for causing the computer to receive a modification request message, sent from the first base station to the second base station, to modify handling of the at least one data bearer at the second base station; and
program code for causing the computer to terminate exchange of data for the at least one data bearer with the UE.

30. An apparatus configured for wireless communication, the apparatus comprising:
at least one processor; and
a memory coupled to the at least one processor,
wherein the at least one processor is configured:
to identify a plurality of data bearers configured for a user equipment (UE) served by a first base station;
to receive from the UE a measurement report identifying a second base station;
to determine to offload at least one data bearer, among the plurality of data bearers, to the second base station;
to communicate with the second base station by the first base station to offload the at least one data bearer to the second base station, wherein data for the UE is sent via the plurality of data bearers through the first base station and the second base station;
to forward data for the at least one data bearer from the first base station to the second base station;
to determine, by the first base station, to modify handling of the at least one data bearer at the second base station; and
to communicate with the second base station, by the first base station, to modify handling of the at least one data bearer.

31. An apparatus configured for wireless communication, the apparatus comprising:
at least one processor; and
a memory coupled to the at least one processor,
wherein the at least one processor is configured:
- to identify a plurality of data bearers configured for a user equipment (UE) served by a first base station;
- to receive from the UE a measurement report identifying a second base station;
- to determine to offload at least one data bearer, among the plurality of data bearers, to the second base station;
- to communicate with the second base station by the first base station to offload the at least one data bearer to the second base station;
- to communicate with a Mobility Management Entity (MME) to convey the at least one data bearer being offloaded to the second base station, wherein data for the UE is sent via the plurality of data bearers through the first base station and the second base station;
- to determine, by the first base station, to modify handling of the at least one data bearer at the second base station; and
- to communicate with the second base station, by the first base station, to modify handling of the at least one data bearer.

32. An apparatus configured for wireless communication, the apparatus comprising:
at least one processor; and
a memory coupled to the at least one processor,
wherein the at least one processor is configured:
- to receive an offload request message sent from a first base station to a second base station, the offload request message conveying at least one data bearer to offload to the second base station, the at least one data bearer being among a plurality of data bearers configured for a user equipment (UE);
- to admit the at least one data bearer of the UE at the second base station;
- to receive, at the second base station, data for the at least one data bearer from the first base station;
- to exchange the data for the at least one data bearer of the UE via the second base station;
- to receive a modification request message, sent from the first base station to the second base station, to modify handling of the at least one data bearer at the second base station; and
- to terminate exchange of data for the at least one data bearer with the UE.

33. The non-transitory computer-readable medium of claim 27, wherein the program code for causing the computer to communicate with the second base station by the first base station to offload the at least one data bearer comprises:
program code for causing the computer to send an offload request message from the first base station to the second base station, the offload request message conveying the at least one data bearer being offloaded to the second base station.

34. The non-transitory computer-readable medium of claim 33, wherein the offload request message further includes quality-of-service (QoS) information for the at least one data bearer.

35. The non-transitory computer-readable medium of claim 27, further comprising:
program code for causing the computer to send a reconfiguration message from the first base station to the UE, the reconfiguration message including radio resource configuration information for at least one radio access bearer associated with the at least one data bearer being offloaded to the second base station.

36. The non-transitory computer-readable medium of claim 27, wherein the program code for causing the computer to determine to modify handling of the at least one data bearer at the second base station comprises:
program code for causing the computer to receive a second measurement report from the UE at the first base station; and
program code for causing the computer to determine to modify handling of the at least one data bearer at the second base station based on the second measurement report.

37. The non-transitory computer-readable medium of claim 27, wherein the program code for causing the computer to communicate with the second base station by the first base station to modify handling of the at least one data bearer comprises:
program code for causing the computer to send a modification request message, from the first base station to the second base station, to modify the at least one data bearer at the second base station.

38. The non-transitory computer-readable medium of claim 27, further comprising:
program code for causing the computer to send a reconfiguration message from the first base station to the UE, the reconfiguration message including radio resource configuration information for one or more radio access bearers associated with the at least one data bearer whose handling is being modified at the second base station.

39. The non-transitory computer-readable medium of claim 28, further comprising:
program code for causing the computer to send a reconfiguration message from the first base station to the UE, the reconfiguration message including radio resource configuration information for at least one radio access bearer associated with the at least one data bearer being offloaded to the second base station.

40. The non-transitory computer-readable medium of claim 28, wherein the program code for causing the computer to determine to modify handling of the at least one data bearer at the second base station comprises:
program code for causing the computer to receive a second measurement report from the UE at the first base station; and
program code for causing the computer to determine to modify handling of the at least one data bearer at the second base station based on the second measurement report.

41. The non-transitory computer-readable medium of claim 28, wherein the program code for causing the computer to communicate with the second base station by the first base station to modify handling of the at least one data bearer comprises:
program code for causing the computer to send a modification request message, from the first base station to the second base station, to modify the at least one data bearer at the second base station.

42. The non-transitory computer-readable medium of claim 28, further comprising:
program code for causing the computer to send a reconfiguration message from the first base station to the UE, the reconfiguration message including radio resource configuration information for one or more radio access bearers associated with the at least one data bearer whose handling is being modified at the second base station.

43. The apparatus of claim 30, wherein the configuration of the at least one processor to communicate with the second base station by the first base station to offload the at least one data bearer comprises configuration of the at least one processor:
to send an offload request message from the first base station to the second base station, the offload request message conveying the at least one data bearer being offloaded to the second base station.

44. The apparatus of claim 43, wherein the offload request message further includes quality-of-service (QoS) information for the at least one data bearer.

45. The apparatus of claim 30, further comprising configuration of the at least one processor:
to send a reconfiguration message from the first base station to the UE, the reconfiguration message including radio resource configuration information for at least one radio access bearer associated with the at least one data bearer being offloaded to the second base station.

46. The apparatus of claim 30, wherein the configuration of the at least one processor to determine to modify handling of the at least one data bearer at the second base station comprises configuration of the at least one processor:
to receive a second measurement report from the UE at the first base station; and
to determine to modify handling of the at least one data bearer at the second base station based on the second measurement report.

47. The apparatus of claim 30, wherein the configuration of the at least one processor to communicate with the second base station by the first base station to modify handling of the at least one data bearer comprises configuration of the at least one processor:
to send a modification request message, from the first base station to the second base station, to modify the at least one data bearer at the second base station.

48. The apparatus of claim 30, further comprising configuration of the at least one processor:
to send a reconfiguration message from the first base station to the UE, the reconfiguration message including radio resource configuration information for one or more radio access bearers associated with the at least one data bearer whose handling is being modified at the second base station.

49. The apparatus of claim 31, further comprising configuration of the at least one processor:
to send a reconfiguration message from the first base station to the UE, the reconfiguration message including radio resource configuration information for at least one radio access bearer associated with the at least one data bearer being offloaded to the second base station.

50. The apparatus of claim 31, wherein the configuration of the at least one processor to determine to modify handling of the at least one data bearer at the second base station comprises configuration of the at least one processor:
to receive a second measurement report from the UE at the first base station; and
to determine to modify handling of the at least one data bearer at the second base station based on the second measurement report.

51. The apparatus of claim 31, wherein the configuration of the at least one processor to communicate with the second base station by the first base station to modify handling of the at least one data bearer comprises configuration of the at least one processor:
to send a modification request message, from the first base station to the second base station, to modify the at least one data bearer at the second base station.

52. The apparatus of claim 31, further comprising configuration of the at least one processor:
to send a reconfiguration message from the first base station to the UE, the reconfiguration message including radio resource configuration information for one or more radio access bearers associated with the at least one data bearer whose handling is being modified at the second base station.

* * * * *